(12) United States Patent
Cavalcanti et al.

(10) Patent No.: US 10,313,977 B2
(45) Date of Patent: Jun. 4, 2019

(54) ADAPTIVE NETWORK TOPOLOGY

(71) Applicant: INTEL CORPORATION, Santa Clara, CA (US)

(72) Inventors: Dave Cavalcanti, Portland, OR (US); Vallabhajosyula S. Somayazulu, Portland, OR (US); Yiting Liao, Hillsboro, OR (US); Jaroslaw J. Sydir, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 15/390,310

(22) Filed: Dec. 23, 2016

(65) Prior Publication Data
US 2018/0184360 A1 Jun. 28, 2018

(51) Int. Cl.
*H04W 52/02* (2009.01)
*H04W 40/24* (2009.01)
(Continued)

(52) U.S. Cl.
CPC ....... *H04W 52/0261* (2013.01); *H04W 40/24* (2013.01); *H04W 84/20* (2013.01); *H04W 88/04* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01);
(Continued)

(58) Field of Classification Search
None
See application file for complete search history.

(56) References Cited

U.S. PATENT DOCUMENTS

2007/0015461 A1* 1/2007 Park .................. H04W 72/1231
455/13.1
2009/0141666 A1 6/2009 Jin et al.
(Continued)

FOREIGN PATENT DOCUMENTS

KR 10-0999562 B1 12/2010

OTHER PUBLICATIONS

International Search Report and Written Opinion dated Jan. 16, 2018 for International Application No. PCT/US2017/055113, 14 pages.
(Continued)

*Primary Examiner* — Anh Ngoc M Nguyen
(74) *Attorney, Agent, or Firm* — Schwabe, Williamson & Wyatt, P.C.

(57) ABSTRACT

Apparatuses, systems and methods associated with adaptive communication topology within a wireless mesh network of devices are disclosed herein. In embodiments, a computer device, may include wireless circuitry to communicate with a leader of a network and a controller coupled to the wireless circuitry. The controller may identify one or more values located within a message received via the network, wherein the one or more values are generated by the leader, and determine in which of one or more operation modes the computer device is to operate based, at least partially, on the one or more values. Other embodiments may be described and/or claimed.

25 Claims, 17 Drawing Sheets

| Rank | Operation Mode Selection Value (Mode = Relay) | Operation Mode Selection Value (Mode = End Point) |
|---|---|---|
| 1 | 0.3 | 0.2 |
| 2 | 0.5 | 0.1 |
| 3 | 0 | 0 |

(51) Int. Cl.
  *H04W 84/20* (2009.01)
  *H04W 88/04* (2009.01)
(52) U.S. Cl.
  CPC ............ *Y02D 70/164* (2018.01); *Y02D 70/20* (2018.01); *Y02D 70/22* (2018.01)

(56) References Cited

U.S. PATENT DOCUMENTS

| | | | |
|---|---|---|---|
| 2010/0008256 A1 | 1/2010 | Chebbo et al. | |
| 2015/0018025 A1 | 1/2015 | Wu | |
| 2016/0315832 A1* | 10/2016 | Hu | H04L 25/20 |
| 2016/0366634 A1* | 12/2016 | Khalife | H04B 7/155 |
| 2017/0127468 A1* | 5/2017 | Saikusa | H04W 4/70 |

OTHER PUBLICATIONS

Yifei Wei et al., "Distributed Optimal Relay Selection in Wireless Cooperative Networks With Finite-State Markov Channels", In: IEEE Transactions on Vehicular Technology, pp. 2149-2158, vol. 59, Issue: 5, Feb. 20, 2010.

Winter et al, "RPL: IPv6 Routing Protocol for Low-Power and Lossy Networks," Internet Engineering Task Force (IETF), Request for Comments: 6550, Category: Standards Track, ISSN: 2070-1721, Mar. 2012, 157 pages.

Thread Group, "Thread Stack Fundamentals," White paper, Jul. 13, 2015, 21 pages.

* cited by examiner

ADAPTIVE NETWORK TOPOLOGY

TECHNICAL FIELD

The present disclosure relates to the field of device networks. More particularly, the present disclosure relates to adaptive communication topology within a wireless mesh network of devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In wireless mesh networks, at least some devices within a wireless mesh network may operate as a relay for other devices within the wireless mesh network, relaying communications between a gateway of the network and the other devices, or between any two or more devices within the network.

Devices acting as relays may remain in an active state, where the devices may continually listen for or relay communications from the other devices or the gateway to, or may transmit or receive the devices' own communications. When in the active state, the device may use more energy than when the device is operating in an idle state, which may occur when the devices are operating in an end point operation mode. For battery-powered devices, the additional energy draw of operating as a relay may cause the battery to be drained faster than when the devices operate in the end point operation mode. Further, having many devices operating as relays requires high amounts of routing control overhead, which may result in high energy draws from the devices and possible communication delays.

Legacy wireless mesh networks addressed these challenges by designating a single leader to gather state information for every device within the network to build an accurate view of the network deployment. Based on the view of the network deployment, the leader would determine which of the devices within the network should operate as relays and would provide requests to the devices to operate in relay operation mode. The single leader having to gather and store the state information for every device within the network required large amounts of memory and bandwidth. Further, the single leader dichotomy added significant amounts of communication overhead that would increase power consumption and degrade communication performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
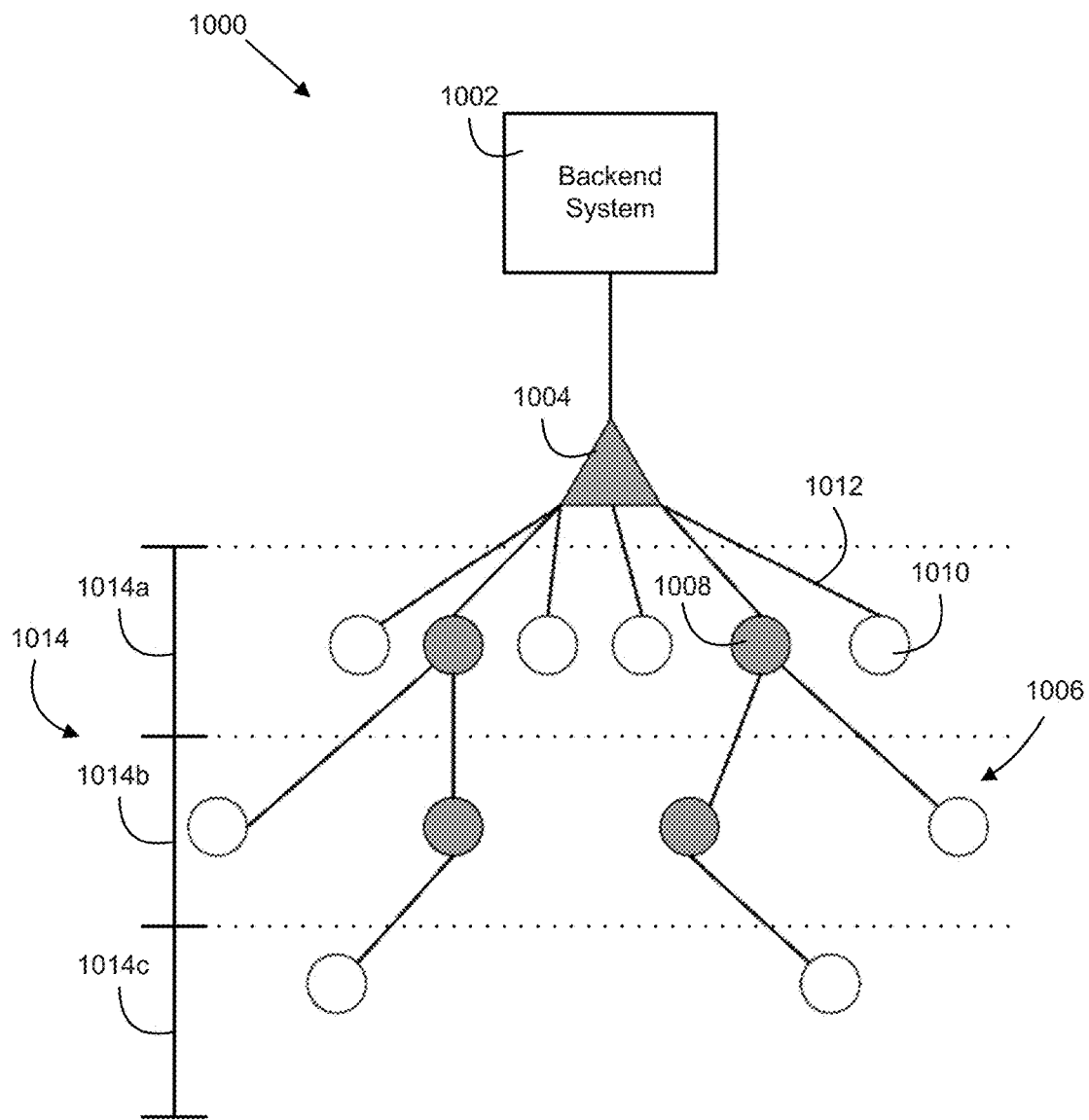
FIG. 1 illustrates an example wireless mesh network, according to various embodiments.

Apparatuses, systems and methods associated with adaptive communication topology within a wireless mesh network of devices are disclosed herein. In embodiments, a computer device, may include wireless circuitry to communicate with a leader of a network and a controller coupled to the wireless circuitry. The controller may identify one or more values located within a message received via the network, wherein the one or more values are generated by the leader, and determine in which of one or more operation modes the computer device is to operate based, at least partially, on the one or more values.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example wireless mesh network 1000, according to various embodiments. The wireless mesh network 1000 may include a backend system 1002 coupled to a gateway 1004. The backend system 1002 may receive requests from the gateway 1004 and may provide resources to the gateway 1004. The resources provided by the backend system 1002 may include provision of data, access to data stored on servers and/or databases coupled to the backend system 1002, access to data and devices within other networks (such as the internet) with which the backend system 1002 may communicate, computational and operational support for the gateway 1004 (including provision of additional processing power for the gateway 1004), storage support to store data provided by the gateway 1004, commands or configuration updates, or some combination thereof.

The wireless mesh network 1000 may further include one or more devices 1006 (denoted as circles in FIG. 1) that may be coupled to the gateway 1004 and may communicate, directly or indirectly via relayed communication, with the gateway 1004. Devices 1006 may be heterogeneous devices of any number of device types, such as Internet-of-Things (IoT) devices. Communications transmitted by the devices 1006 to the gateway 1004 may include requests for the resources provided by the backend system 1002 for provision to the devices 1006 or to be utilized to perform operations for the devices 1000, periodic data, events, or some combination thereof. The gateway 1004 may operate as a relay between the backend system 1002 and the devices 1006, relaying communications from the devices 1006 to the backend system 1002 and the resources or data resulting from the application of the resources of the backend system 1002 to the devices 1006. In some embodiments, the gateway 1004 may further perform formatting on the communications between the devices 1006 and the backend system 1002 to format the communications into a format readable by the either the devices 1006 or the backend system 1002 to which the communication is directed.

The devices 1006 may communicate with the gateway 1004 via one or more links 1012. The links 1012 may provide for communication directly and/or indirectly (via relayed communication) among the devices 1006 and the gateway 1004. The links 1012 may be defined and/or generated via an association procedure of the devices 1006 within the network 1000. A device, of the devices 1006, may perform the association procedure to join the network 1000 and may generate a link 1012 between the device and one or more of the other devices 1006, the gateway 1004, or some combination thereof based on the association procedure. The association procedure may include transmission of a request to join the network 1000 by the device attempting to join the network 1000 and a response by one or more of the other devices 1006 and/or the gateway 1004 that may define at least one link between the device and the network 1000 (via one or more of the devices 1006 and/or the gateway 1004).

The devices 1006 may be separated into one or more ranks 1014 (separations between the ranks 1014 denoted by dotted lines in FIG. 1), such as first rank 1014a, second rank 1014b, and third rank 1014c. The ranks 1014 may correspond to a number of links 1012 between the gateway 1004 and the devices 1006. For example, the first rank 1014a may include one link 1012 per device between the gateway 1004 and the devices 1006 within the first rank 1014a, the second rank 1014b may include two links 1012 per device between the gateway 1004 and the devices 1006 within the second rank 1014b, and the third rank 1014c may include three links 1012 per device between the gateway 1004 and the devices 1006 within the third rank 1014c. For the devices 1006 with more than one link 1012 between the gateway 1004 and the devices 1006, other ones of the devices 1006 may be operating as relays between the devices 1006 and the gateway 1004.

The ranks 1014 may be denoted based on a distance between the gateway 1004 and the devices 1006. The distance between the gateway 1004 and the devices for denoting the ranks 1014 may be determined based on a number of hops (e.g. relays) between the gateway 1004 and the devices 1006, power levels at which transmissions from the gateway 1004 are received by the devices 1006, power levels at which transmissions from other ones of the devices 1006 are received by the devices 1006, quality levels at which transmissions from the gateway 1004 are received by the devices 1006, quality levels at which transmissions from other ones of the devices 1006 are received by the devices 1006, other similar metrics for determining a number of links 1012 are to be defined between the gateway 1004 and the devices 1006 to maintain signal quality, or some combination thereof. In some embodiments, the ranks 1014 may be determined based on power used for each of the devices 1006 to transmit a message to the gateway 1004, the quality of messages transmitted by each of the devices 1006 to the gateway 1004, or some combination thereof. The devices 1006 may be able to determine their rank 1014 based on data collected from other ones of the devices 1006 and/or the gateway 1004. The data used to determine rank 1014 may be included in one or more routing control messages, one or more data frames, or some combination thereof.

In some embodiments, the devices 1006 may further communicate, or be able to communicate, with other ones of the devices 1006 within the same rank 1014. For example, a device, of the devices 1006, within the first rank 1014a may communicate, or be able to communicate, with a different device, of the devices 1006, within the first rank

1014a. Devices 1006 within a same rank 1014 may be referred to as neighboring devices. Further, in some embodiments, the neighboring devices may include devices 1006 in different ranks 1014 directly coupled via a link 1012, with which the device may communicate, in addition to the devices 1006 within the same rank 1014. Still further, in some embodiments, the neighboring devices may include other ones of the devices 1006 in different ranks from the device that may not have a link 1012 with the device, although which may still directly (without need for relay of the messages between the other ones of the devices 1006 and the device) communicate with the device.

The devices 1006 may include relay-eligible devices (which may also be referred to as router-eligible end devices), non-relay-eligible devices, or some combination thereof. Relay-eligible devices may operate in relay operation mode and end point operation mode, whereas the non-relay-eligible devices may operate in end point operation mode and not in relay operation mode.

In the relay operation mode, the devices 1006 may operate as relays between other ones of the devices 1006 and the gateway 1004, transmitting data and/or messages between the other ones of the devices 1006 and the gateway 1004. The devices 1006 operating in the relay operation mode may remain in an active state listening for communications from the gateway 1004 and the other ones of the devices 1006 for which the devices 1006 act as a relay. In some embodiments, the devices 1006 in relay operation mode may transition between the active state, listening for the communications from the other ones of the devices 1006 and the gateway 1004, and an idle state, where the devices are not listening for the communications and are in a power-saving state, at defined intervals.

In the end point operation mode, the devices 1006 may remain in the idle state with the exception of when transmitting communications to the gateway 1004 and/or receiving scheduled transmissions from the gateway 1004. In some embodiments, the devices operating in the end point operation mode may transition between the active state and the idle state at defined intervals, although may remain in the active state for less time of a communication cycle than the devices operating in the relay operation mode. Due to the devices 1006 operating in end point operation mode remaining in the idle state for longer periods of time than the devices operating in the relay operation mode, the devices 1006 operating in the end point operation mode may use less power than the devices 1006 operating in the relay operation mode.

For the relay-eligible devices, the devices may operate in the relay operation mode at times and may operate in the end point operation mode at other times based on a selection and/or an assignment of the operation mode for the device. In response to a selection and/or assignment to operate in the relay operation mode, the relay-eligible devices may transition into the relay operation mode. Further, in response to a selection and/or assignment to operate in the end point operation mode, the relay-eligible devices may transition into the end point operation mode. Multiple selection and/or assignment procedures of the operation mode for relay-eligible devices are described throughout this disclosure.

The selection and/or assignment of whether to operate in relay operation mode or end point operation mode may be based on one or more operation mode selection values. The operation mode selection values may be generated by a leader of the network 1000 and transmitted, either directly or indirectly via relayed communication, to devices 1006. In some embodiments, the gateway 1004 may operate as the leader of the network 1000. In other embodiments, one or more of the devices 1006 may operate as the leader of the network 1000. Further, in some embodiments, the leader may be selected to be the gateway 1004 and/or one or more of the devices 1006 based on characteristics of the gateway 1004 and/or the devices 1006. The leader may be selected based on the selected device and/or the gateway 1004 having the highest processing power within the network 1000, the largest amount of memory within the network 1000, the ability to lead, the ability to coordinate a particular data type or types, handle the speed of requests within the network 1000, the first to respond to a request to operate as the leader, ability to implement protocols to transmit data within the network 1000, providing a minimal number of hops to an identified sensor collecting desired data within the network 1000, or some combination thereof. The generation of the operation mode selection values is described further throughout this disclosure.

In some embodiments, the selection and/or assignment of whether to operate in relay operation mode or end point operation mode may be based on information associated with the network 1000. The information may include a number of relay-eligible devices within the network 1000, a total number of the devices 1006 within the network, a number of the devices 1006 operating in the relay operation mode within the network 1000, a number of the devices 1006 within each of the ranks 1014, a number of relay-eligible devices within each of the ranks 1014, a number of the devices 1006 operating in the relay operation mode in each of the ranks 1014, a number of the ranks 1014, an indication of the largest rank 1014 within the network 1000, or some combination thereof. Further, in some embodiments, the selection and/or assignment may be based on information associated with each of the devices 1006, such as a battery level of the devices 1006, errors encountered by the devices 1006, a number of relays between the leader and the devices, or some combination thereof. The information associated with the network 1000 and/or each of the devices 1006 may be identified or determined by the devices 1006, the gateway 1004, or some combination thereof.

In some embodiments, the relay-eligible devices and/or the non-relay-eligible devices may operate in additional operation modes. The additional operation modes may include other power-saving modes and/or high performance modes. For example, the additional operation modes may include an energy-saving operation mode, where the devices operating in the energy-saving operation mode are in the active state for a period of time within a communication cycle between the amount of time the devices operating in the relay operation mode spend in the active state and the amount of time the devices operating in the end point operation mode spend in the active state. Further, the additional operation modes may include a discontinuous operation mode where the devices are in the active state for a portion of one communication cycle out of multiple communication cycles. The relay-eligible devices and/or the non-relay eligible devices may enter these states based on the selection and/or assignment of operation mode.

The devices 1006 may include a first portion 1008 of the devices 1006 (denoted as shaded circles in FIG. 1) operating in the relay operation mode and a second portion 1010 of the devices 1006 (denoted as unshaded circles in FIG. 1) operating in the end point operation mode. The first portion 1008 may include relay-eligible devices and may be operating in the relay operation mode based on a selection and/or assignment that instructed the first portion 1008 to operate in the relay operation mode. The second portion 1010 may include relay-eligible devices and/or non-relay eligible end devices, and may be operating in the end point operation mode based on a selection and/or assignment that instructed the second portion 1010 to operate in the end point operation mode or based on being a non-relay eligible end device that may operate only in the end point operation mode.

Figure 2:
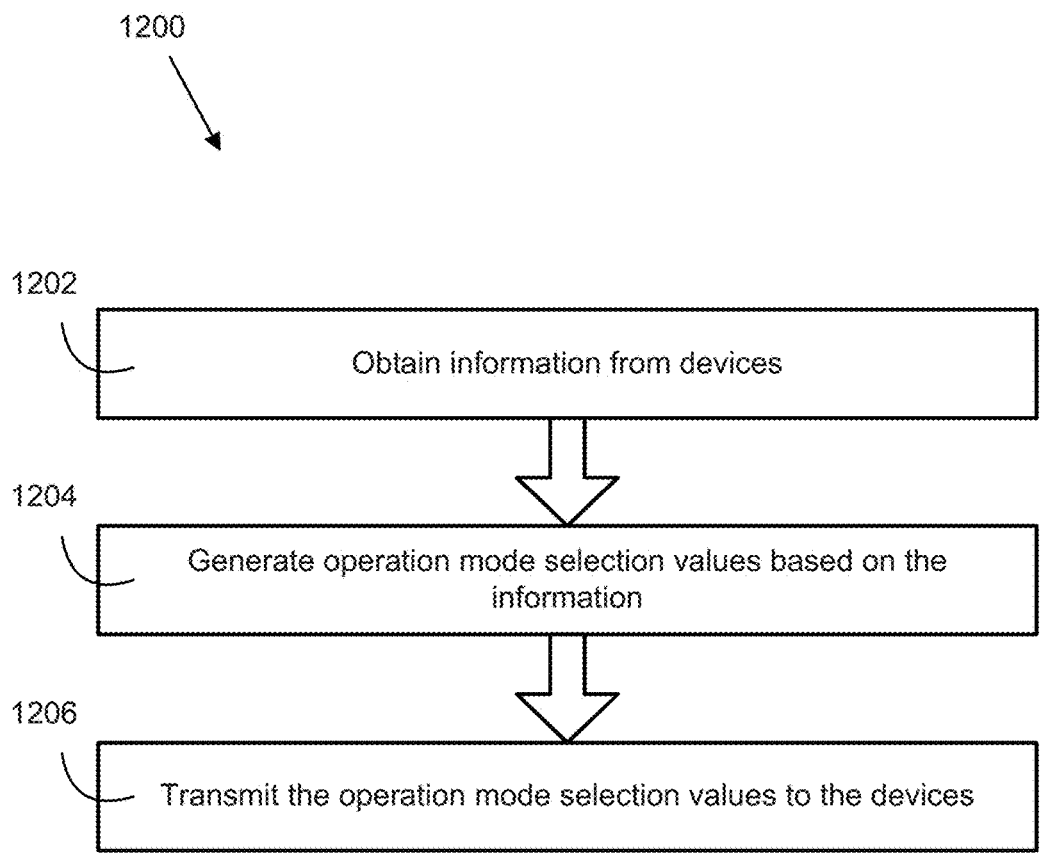
FIG. 2 illustrates an example operation mode selection value generation procedure, according to various embodiments.

FIG. 2 illustrates an example operation mode selection value generation procedure 1200, according to various embodiments. The operation mode selection value generation procedure 1200 may be performed by the leader of the network 1000 (FIG. 1), which may be the gateway 1004 (FIG. 1), one of the devices 1006 (FIG. 1), or some combination thereof. The operation mode selection value generation procedure 1200 may be performed at an initiation of the network 1000, when one or more devices 1006 are added to the network 1000, at certain time intervals (either predetermined or assigned by the backend system 1002), or some combination thereof.

In 1202, the leader may obtain, from the devices 1006, the information associated with the network 1000 and/or information associated with the devices 1006. The leader may query the devices 1006 for the information. The leader may transmit a request for the information to a portion of the devices 1006. The portion of the devices 1006 that receive the request may transmit the requested information, associated with the portion of the devices 1006 or an entirety of the devices 1006, to the leader. For example in an embodiment where the gateway 1004 is operating as the leader, the gateway 1004 may query one of the devices 1006 within the first rank 1014a (FIG. 1), which may transmit the information to the leader. The leader querying a portion of the devices 1006 for the information may have reduced communication overhead compared to the leader querying all the devices 1006 within the network for information.

Further, the leader may limit information queried to certain information associated with the network 1000 and/or the devices 1006. The certain information may be selected based on information which the leader utilizes to generate the operation mode selection values. For example, in some embodiments the leader may generate the operation mode selection values based on the number of devices 1006 in each of the ranks 1014. In these embodiments, the leader may query the devices 1006 for the number of devices 1006 in each of the ranks 1014 and omit other information from the query, such that the queried devices 1006 may return just the number of devices 1006 within each rank. The leader limiting the information queried may provide for less communication overhead and/or lower data storage space for storage of the information than if the leader was to query for all the information associated with the network 1000 and/or the devices 1006.

The devices 1006 queried may have obtained (or obtain in real time) the information associated with the network 1000 and/or the other devices 1006 via communication with its neighboring devices and/or the devices 1006 with a direct link 1012 with the devices 1006 queried. The neighboring devices and/or the devices 1006 that provide information to the devices 1006 queried may have obtained the information from their neighboring devices and/or devices 1006 with a direct link to the devices 1006 providing the information. The information provided by the devices 1006 to the leader may include any of the information associated with the network 1000 and/or the information associated with devices 1006 described in relation to FIG. 1.

In some embodiments, the devices 1006 queried may return a message to the leader indicating the ranks 1014 associated with each of the devices 1006 being queried. The leader may be able to determine the number of the devices 1006 within the one or more of the ranks 1014 based on the indications of the ranks 1014 associated with each of the devices 1006 being queried.

In other embodiments, the leader may listen for broadcasts (such as routing control packets and/or other advertisement packets) transmitted by the devices 1006 rather than querying the devices 1006. The broadcasts transmitted by the devices 1006 may include the information associated with the network 1000 and/or the devices 1006. The leader may identify the information within one or more of the broadcasts, may extract the information from the broadcasts, and may consolidate the information from the broadcasts for utilization in generating the operation mode selection values. In some of these embodiments, the leader may determine a topology of the network 1000 based on the information and derive further information based on the topology that may be utilized for the generation of the operation mode selection values.

In 1204, the leader may generate operation mode selection values based on the information received. The operation mode selection values may be within a range from zero to one. In embodiments where there are two operation modes, the operation mode selection values may correspond to a probability that the devices corresponding to the operation mode selection values are to operate in one of the operation modes associated with the operation mode selection values. For example, in the embodiments where the operation modes include the relay operation mode and the end point operation mode, and an operation mode selection value associated with one of the devices 1006 is 0.3, there may be a 0.3 (or 30%) probability that the one of the devices 1006 will operate in the relay operation mode.

In some embodiments, the leader may generate different operation mode selection values for each of the ranks 1014 within the network 1000. The operation mode selection values may be generated based on a number of the devices 1006 within each rank 1014, a number of the devices 1006 within each rank 1014, a number of the devices 1006 that are relay-eligible devices within each rank 1014, a number of the devices 1006 that are relay-eligible devices within each rank 1014, or some combination thereof. The leader may store each of the operation mode selection values with an associated rank 1014, such as within a table.

In 1206, the leader may transmit the operation mode selection values to the devices 1006. The leader may transmit the operation mode selection values to one or more of the devices 1006 within the first rank 1014a. The devices 1006 that receive the transmission directly from the leader may, in turn, relay the operation mode selection values to the neighboring devices and/or the devices 1006 within the other ranks, such as the second rank 1014b and the third rank 1014c.

In some embodiments, the leader may broadcast the operation mode selection values to the network 1000. The broadcast of the operation mode selection values may be transmitted to the network 1000 without being directed to a specific device, of the devices 1006, or devices 1006. One or more of the devices 1006 may detect the broadcast and identify the operation mode selection values within the broadcast. The devices 1006 that detect the broadcast may relay the operation mode selection values to neighboring devices and/or the devices 1006 within the other ranks.

Figure 3:
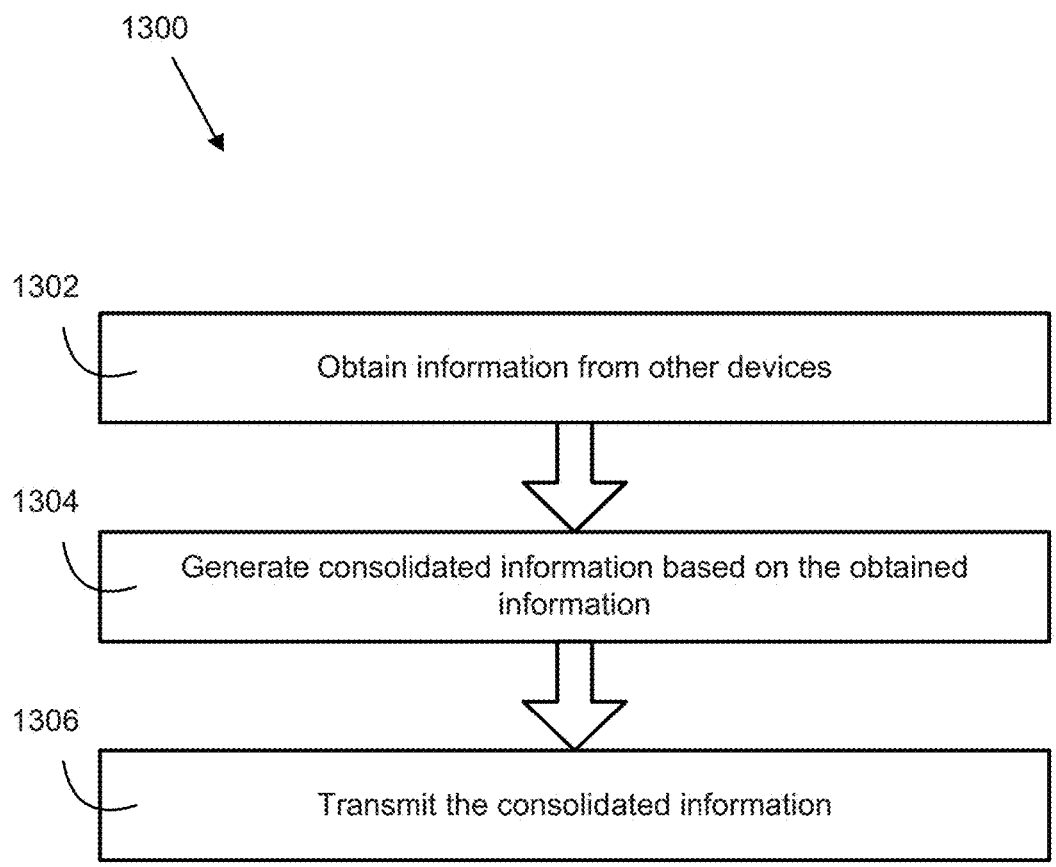
FIG. 3 illustrates an example device information acquisition procedure, according to various embodiments.

FIG. 3 illustrates an example device information acquisition procedure 1300, according to various embodiments. The procedure 1300 may be performed by one or more of the devices 1006 (FIG. 1) within the network 1000 (FIG. 1). In some embodiments, the devices 1006 operating in the relay operation mode may perform the procedure 1300, while the devices 1006 operating in the end point operation mode may forgo performing the procedure 1300. The procedure 1300 may be performed by the devices 1006 in response to a request for information received from the leader and/or other ones of the devices 1006, at certain intervals (either predetermined or assigned by the backend system 1002 (FIG. 1)), in response to expiration of a timer described in relation to the operation mode redetermination procedure 1500 (described in relation to FIG. 5), or some combination thereof.

In 1302, the device, of the devices 1006, performing the procedure 1300 may obtain information from one or more of the other devices 1006 within the network 1000. The information may include the information associated with the network 1000 and/or the information associated with the devices 1006 described in relation to FIG. 1. The device may obtain the information by querying one or more of the other devices 1006 for the information, by detecting the information included in broadcasts transmitted by the other devices 1006, or some combination thereof. The device may store the obtained information, or some portion thereof.

In 1304, the device may generate consolidated information based on the obtained information. Generating the consolidated information may include consolidating values corresponding to each metric within the obtained information into a single value corresponding to the metric, which may be average of the values, a summation of the values, a largest of the values, a smallest of the values, a median of the values, a mode of the values, or some combination thereof. In some embodiments, consolidating the information may include disregarding values that appear to be corrupted. Further, generating the consolidated information may include supplementing the obtained information with information associated with the device performing the procedure 1300 in order to generate the consolidated information.

In 1306, the device may transmit the consolidated information. The device may transmit the consolidated information in a transmission directed to another of the devices 1006, the gateway 1004, or the leader, in a broadcast transmitted by the device within the network 1000, or some combination thereof. The device may transmit the consolidated information in response to a request for the information received from one or more of the other devices 1006 or the gateway 1004, at certain intervals (either predetermined or assigned by the backend system 1002), or some combination thereof.

Figure 4:
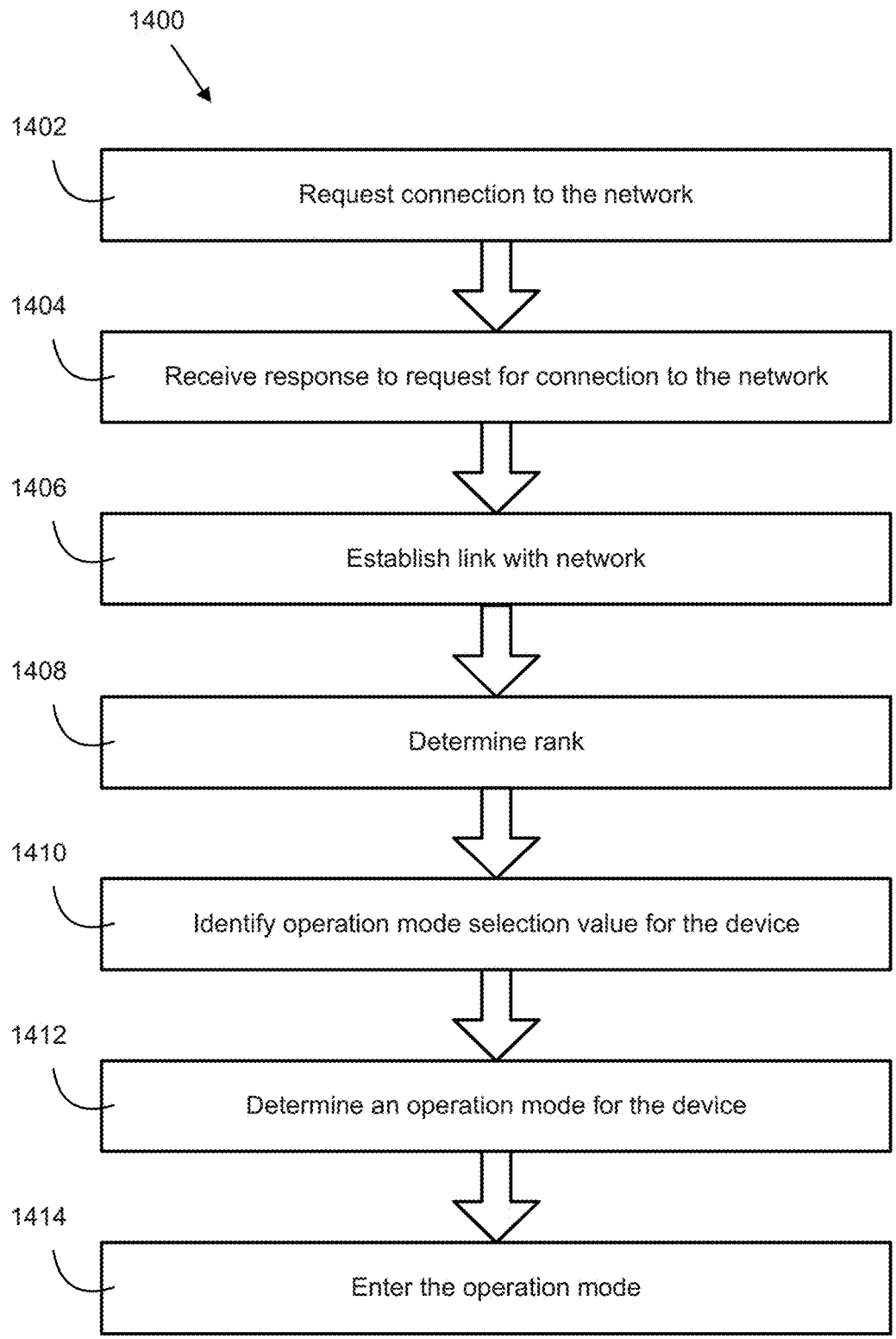
FIG. 4 illustrates an example network association procedure, according to various embodiments.

FIG. 4 illustrates an example network association procedure 1400, according to various embodiments. The network association procedure 1400 may be performed by a device, such as the devices 1006 (FIG. 1), entering, or attempting to enter, the network 1000 (FIG. 1).

In 1402, the device may request connection to the network 1000. The device may transmit a broadcast within the network 1000 requesting connection to the network 1000. In other embodiments, the device may monitor for broadcasts from one or more of the devices 1006 within the network 1000 and/or broadcast from the gateway 1004. The broadcasts may be transmitted by the devices 1006 operating in the relay operation mode within the network 1000. In response to identifying a broadcast from one of the devices 1006 or the gateway 1004 within the network 1000, the device may transmit the message requesting connection to the network 1000 to the one of the devices 1006 or the gateway 1004 that originated the identified broadcast. If the device identifies multiple broadcasts, the device may transmit the message requesting connection to the network 1000 to a device or the gateway 1004, associated with at least one of the broadcasts, having a largest operation mode selection value or that is already operating in the relay operation mode.

In 1404, the device may receive a response to the request for connection to the network 1000. The response may be transmitted by one or more devices 1006 within the network 1000 and/or the gateway 1004 that identified the message requesting connection to the network 1000. In some embodiments, the response may be transmitted by the one of the devices 1006 within the network 1000 or the gateway 1004 to which the device 1006 directed the message requesting connection to the network 1000.

The response may include an indication that the one of the devices 1006 within the network 1000 or the gateway 1004 from which the response was received can provide connection to the network 1000. Alternatively, the response may include an indication that another one of the devices 1006 within the network 1000 or the gateway 1004 may provide connection to the network 1000. The indication may include an identifier of the one of the devices 1006 within the network 1000 or the gateway 1004 that may provide connection to the network 1000. In some embodiments, the response may further include a procedure for establishing a connection with the network 1000, a time for an initial transmission from the device to establish the connection with the network 1000, information associated with the one of the devices 1006 within the network 1000 (such as the rank of the one of the devices 1006 providing connection to the network 1000), or some combination thereof.

In 1406, the device may establish a link, such as the links 1012 (FIG. 1), with the network 1000. The device may establish the link with the one of the devices 1006 within the network 1000 or the gateway 1004 that is to provide connection to the network 1000.

In 1408, the device requesting connection to the network 1000 may determine a rank, such as the one or more ranks 1014 (FIG. 1), associated with the device. The device may determine the rank based on the distance between the gateway 1004 and the device, as described in relation to FIG. 1. For example, the rank may be determined based on a rank of one of the devices 1006 within the network 1000 that provides the connection to the device, a number of hops between the gateway 1004 and the device determining the rank, a determined power associated with transmissions received directly from the gateway 1004, or some combination thereof.

In 1410, the device may identify one or more operation mode selection values for the device. The operation mode selection values may be identified in one or more messages received from other devices 1006 within the network 1000, the gateway 1004, or some combination thereof. In some embodiments, the operation mode selection values may be included in the response received in 1404. The received operation mode selection values may include indications of ranks with which each of the received operation mode selection values is associated. Based on the indications and the rank associated with the device, the device may identify the one or more operation mode selection values for the device.

In 1412, the device may determine an operation mode for the device. The operation mode may be determined based on the one or more operation mode selection values for the device. In particular, the device may randomly draw a value from a group of values for the rank associated with the device, compare the value with the operation mode selection values for the device, and determine the operation mode for the device based on the comparison. For example, if an operation mode selection value for the device is 0.3 for the relay operation mode and the device draws a 0.2 value, the operation mode for the device may be determined to be the relay operation mode based on the comparison of the operation mode selection value of 0.3 and the drawn value of 0.2.

In other embodiments, the device may determine the operation mode for the device further based on information associated with the network 1000 and/or information associated with one or more of the devices 1006 within the network 1000. The information may be obtained via the device information acquisition procedure 1300 (FIG. 3). For example, the device may identify the operation mode selection value for the device 1006 to be 0.3 for the relay operation mode. The operation mode selection value of 0.3 may be associated with a percentage of the devices 1006 within the rank associated with device that are to be operating in the relay operation mode. If the device determines, based on the information, that the percentage of devices operating in the relay operation mode is less than the percentage associated with the operation mode selection value, the device may determine that the operation mode for the device is to be the relay operation mode. However, if the device determines, based on the information, that the percentage of devices operating in the relay operation mode is greater than the percentage associated with the operation mode selection value, the device may determine that the operation mode for the device is to be the end point operation mode (assuming the possible operation modes for the device include the relay operation mode and the end point operation mode).

In 1414, the device may enter the determined operation mode from 1412. The device may continue to operate in the determined operation mode while within the network 1000, until changes occur within the network 1000 (such as addition or removal of devices 1006 within the network 1000, or termination of the network 1000), until a battery level of the device or other devices within the network 1000 drops below a threshold level, until an operation mode redetermination procedure occurs (as described in FIG. 6), or some combination thereof.

Figure 5:
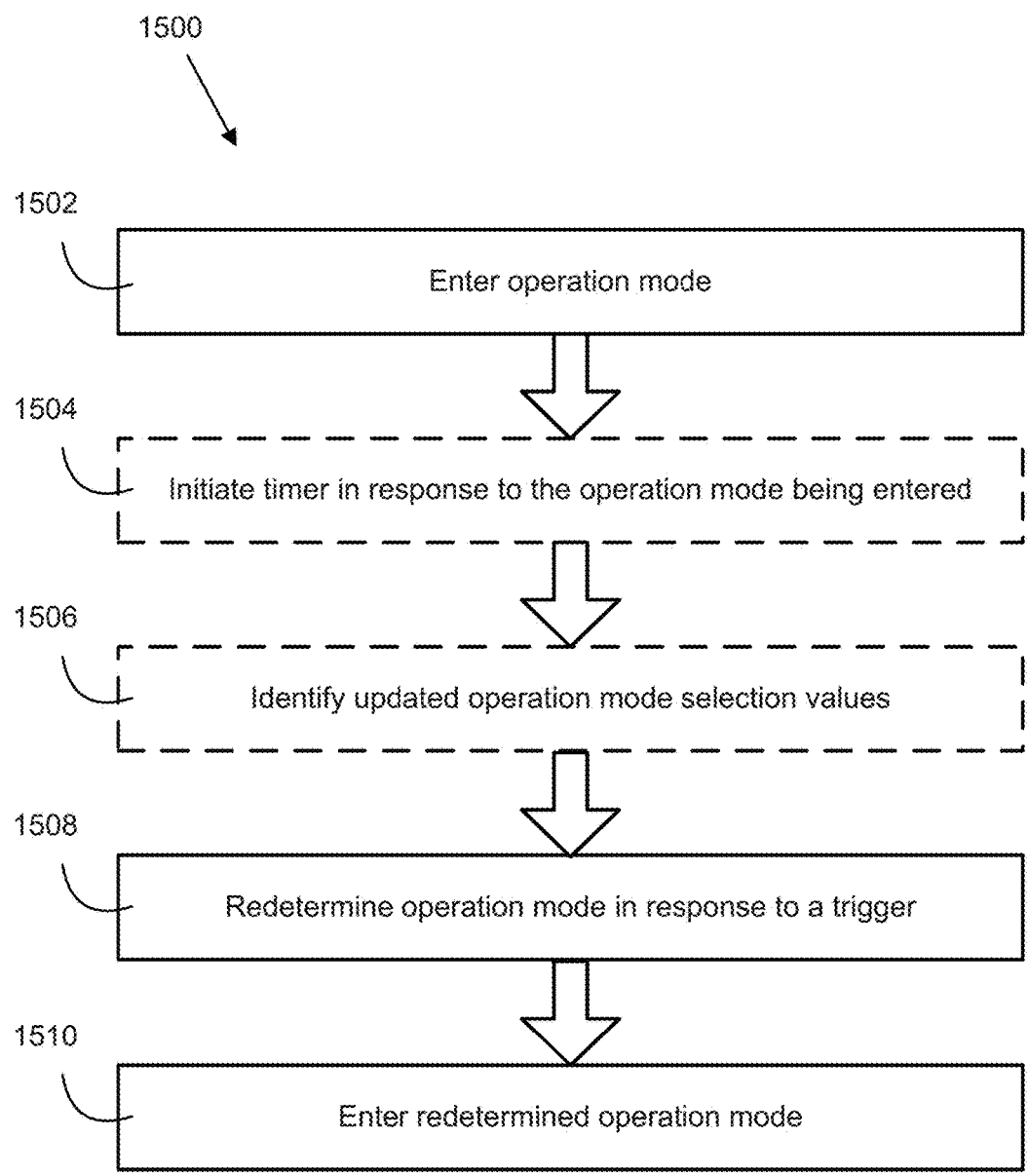
FIG. 5 illustrates an example operation mode entry procedure, according to various embodiments.

FIG. 5 illustrates an example operation mode redetermination procedure 1500, according to various embodiments. The procedure 1500 may be performed by one or more of the devices 1006 (FIG. 1) within the network 1000 (FIG. 1). The procedure 1500 may be performed after a device, of the devices 1006, has entered an operation mode, such as the entry of the operation mode of 1414 (FIG. 4). Further, in some embodiments, the procedure 1500 may be initiated in response to the device entering the operation mode.

In 1502, the device may enter an operation mode. The device may have entered the operation mode as part of an initialization of the network 1000 (as is described further in relation to the wireless mesh network initialization configure 1000 of FIG. 10), as part of a network association procedure 1400 (FIG. 4), or as part of a prior operation redetermination procedure 1500. The entry into the operation mode may include one or more of the features of entry into an operation mode described throughout this disclosure, including the entry into the operation mode of 1414.

In 1504, a timer may be optionally initiated in response to the operation mode being entered in some embodiments. The device may include the timer and may control initiation of the timer. In other embodiments, the timer may be included within the leader of the network 1000 (such as the leader described in relation to FIG. 1), the gateway 1004 (FIG. 1), the backend system 1002 (FIG. 1), or some combination thereof. The timer may be set with a value (which may be predetermined or assigned by the backend system 1002) and may either count from zero up to the value or count from the value down to zero when the timer is initiated. In some embodiments, 1504 may be omitted where the trigger included in 1508 is unrelated to the timer.

In 1506, the device may optionally identify updated operation mode selection values for the device. The leader of the network 1000 may generate the updated operation mode selection values in a same manner as described in the generation of the operation mode selection values of 1204 (FIG. 2). The leader may generate the updated operation mode selection values based on updated information received from querying the devices 1006 for information (such as the querying of the devices 1006 of 1202 (FIG. 2)) after the entry into the operation mode of 1502. As with 1202, in some embodiments, the leader may listen for broadcasts (such as routing control packets and/or other advertisement packets) transmitted by the devices 1006 for the updated information rather than actively querying the devices 1006.

The leader may transmit the updated operation mode selection values to the devices 1006 in one or more of the same manners described in 1206 (FIG. 2), although may be transmitted in a subsequent message transmitted by the leader subsequent to the entry into the operation mode of 1502. The device may identify the updated operation mode selection values associated with the device within the subsequent message and may store the updated operation mode selection values in a memory of the device. In some embodiments, 1506 may be omitted if the device does not receive a subsequent message from the leader including the updated operation mode selection values.

In 1508, regardless whether the optional operations of 1504 and/or 1506 are performed, the device may redetermine the operation mode in which the device 1006 is to operate in response to a trigger. In embodiments where the timer of 1504 is included within the procedure 1500, the trigger may include an expiration of the timer. When the timer is included within the device 1006, the device 1006 may detect the expiration of the timer and redetermine the operation mode in response to detecting the expiration of the timer. When the timer is included within the leader, the gateway 1004, the backend system 1002, or some combination thereof, the leader, the gateway 1004, and/or the backend system 1002 may transmit a message (either directed to the device or broadcast within the network 1000) that indicates that the timer has expired. In response to detecting the expiration of the timer or to identifying the indication within the message that the timer has expired, the device may redetermine the operation mode.

In some embodiments, the trigger may include an indication received from the other devices 1006 within the network 1000, the leaders, the gateway 1004, the backend system 1002, or some combination thereof (herein after referred to as 'the triggering device'). The triggering device may transmit the indication to the device either in a message directed to the device or in a broadcast within the network 1000. The triggering device may transmit the indication in response to expiration of a timer included in the triggering device, detection of changes within the network 1000, the triggering device changing states, or some combination thereof. The device may initiate the redetermination of the operation mode in which the device is to operate in response to identifying the indication.

In 1510, the device 1006 may enter the redetermined operation mode from 1508. The entry of the redetermined operation mode of 1510 may include one or more of the features of the entry of the operation mode of 1414.

Figure 6:
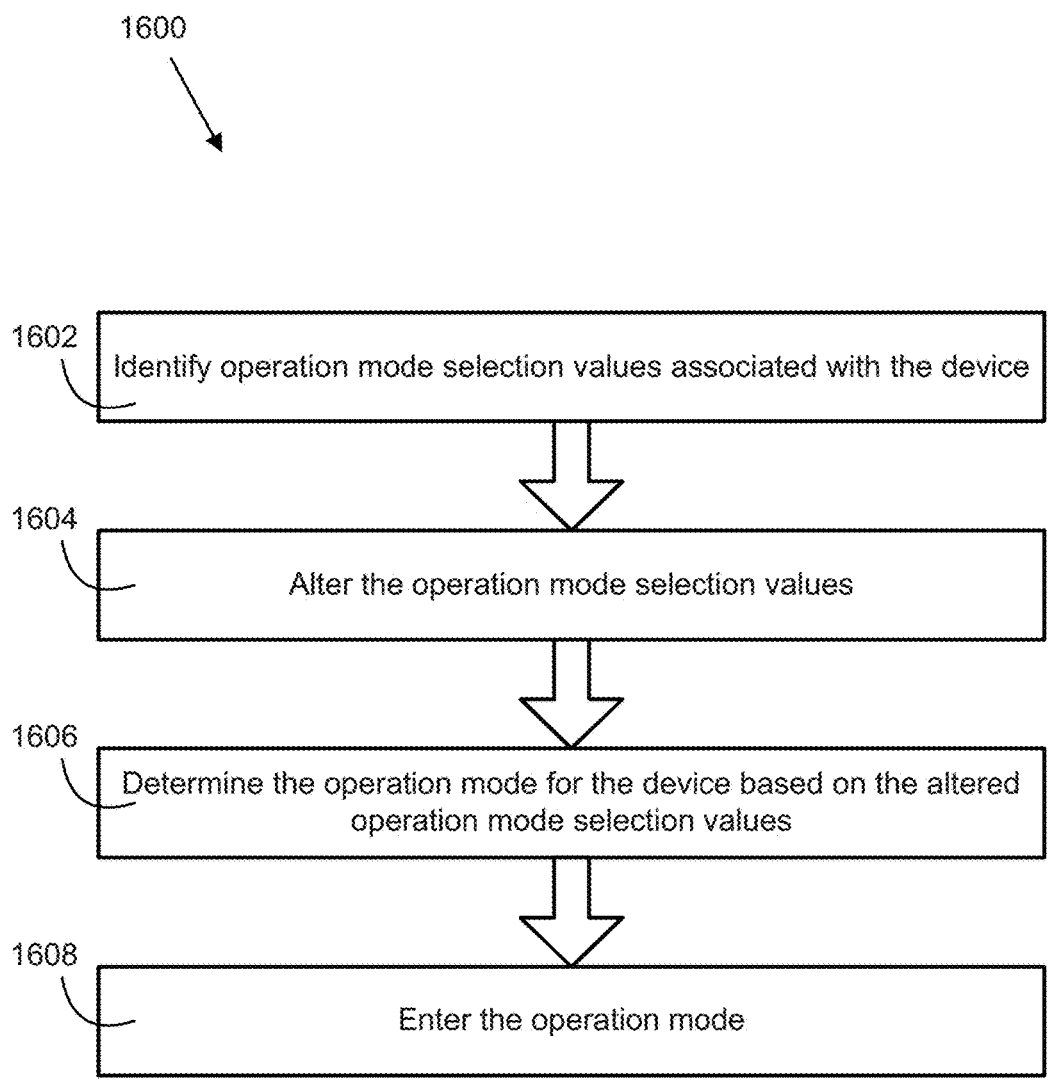
FIG. 6 illustrates an example operation mode redetermination procedure, according to various embodiments.

FIG. 6 illustrates an example operation mode entry procedure 1600 with operation mode selection value alteration, according to various embodiments. The procedure 1600 may be performed by one or more of the devices 1006 (FIG. 1) within the network 1000 (FIG. 1). The procedure 1600 may be performed as part of the network association procedure 1400 (FIG. 4) in some embodiments with the alteration of the one or more operation mode selection values of 1604 being performed after identification of the operation mode selection values of 1410 (FIG. 4) and prior to the determination of the operation mode of 1412 (FIG. 4). Further, the procedure 1600 may be performed as part of the operation mode redetermination procedure 1500 (FIG. 5) in some embodiments with the alteration of the one or more operation mode selection values of 1604 being performed after either the entry into the operation mode of 1502 (FIG. 5) or the identification of the updated operation mode selection values of 1506 (FIG. 5) and before the redetermination of the operation mode of 1510 (FIG. 5). In the embodiments, the determination of the operation mode of 1412 and/or the redetermination of the operation mode of 1510 may be performed based on the altered operation mode selection values.

In 1602, a device, of the devices 1006, may identify one or more operation mode selection values for the device. The identification of the operation mode selection values of 1602 may include one or more of the features of the identification of the operation mode selection values of 1410 and/or the identification of the updated operation mode selection values of 1506.

In 1604, the device may alter the one or more operation mode selection values based on information associated with the device and/or information obtained by the device via the information acquisition procedure 1300 (FIG. 3). The device may alter the operation mode selection values to be higher or lower based on the information obtained by the device. Some non-limiting examples of alteration include: increasing one or more of the operation mode selection values based on the device currently being in a state associated with the operation mode selection values; decreasing the operation mode selection values based on the amount of the devices 1006 within the same rank as the device being greater than the amount of devices 1006 within the adjacent rank to which the device would provide relay services; increasing the operation mode selection values based on the amount of devices 1006 within the same rank as the device 1006 being less than the amount of devices 1006 within the adjacent rank to which the devices 1006 would provide relay services; decreasing the operation mode selection values based on there being many devices 1006 within the same rank as the device; decreasing the operation mode selection values based on the amount of neighboring devices that the device detects (which may be detected via listening by the device during network formation and/or association) being large; increasing the operation mode selection values based on there being few devices 1006 within the same rank as the device; and/or increasing the operation mode selection values based on the amount of neighboring devices that the device detects being small. Further, the device may alter the operation mode selection values based on the device having obtained updated information that it has not provided to the other devices 1006 within the network 1000 and/or to the leader.

In some embodiments, the device may alter the one or more operation mode selection values based on a battery level of the device. The device may lower the operation mode selection values based on the battery level of the device. Further, in some embodiments, the device may alter, in addition to or in lieu of lowering the operation mode selection values based on the battery level of the device, the operation mode selection values to be zero in response to determining that the battery level of the device is below a threshold battery level.

In 1606, the device may determine the operation mode for the device based on the altered operation mode selection values. Determining the operation mode for the device may include one or more of the features the determination of the operation mode of 1412 and/or the redetermination of the operation mode of 1508.

In 1608, the device may enter the determined operation mode of 1606. The entry of the operation mode of 1608 may include one or more of the features of the entry of the operation mode of 1414 and/or the entry of the redetermined operation mode of 1508.

Figure 7:
FIG. 7 illustrates an example operation mode selection table, according to various embodiments.

FIG. 7 illustrates an example operation mode selection table 1700, according to various embodiments. The operation mode selection table 1700 may be generated by the leader of the network 1000 (FIG. 1), such as the leader described in relation to FIG. 1, and may be stored by the leader. The operation mode selection table 1700 may be generated in 1204 (FIG. 2) of the operation mode selection value generation procedure 1200 (FIG. 2). The operation mode selection table 1700 may include one or more ranks 1702 and one or more operation mode selection values 1704 associated with each of the ranks 1702. The table 1700 may include ranks 1702 corresponding to each of the ranks 1014 (FIG. 1) within the network 1000. The operation mode selection values 1704 may correspond to a certain operation mode, such as the relay operation mode or the end point operation mode. While the illustrated embodiment has a single operation mode selection value 1704 associated with each of the ranks 1702, it is to be understood that the operation mode selection values 1704 associated with each of the ranks 1702 may include a range of values associated with the certain operation mode rather than a single value.

The leader of the network 1000 may transmit the table 1700 or the data included within the table 1700 (collectively referred to as 'the table data' in the description of FIG. 7) to one or more of the devices 1006 (FIG. 1) within the network 1000. The leader may transmit the table data in one or more messages directed to the one or more of the devices 1006, may transmit the table data in a broadcast transmitted within the network 1000, or some combination thereof.

In response to identifying the table data, a device, of the devices 1006, may identify a rank 1702 within the table data associated with the rank 1014 of the device. Based on the identified rank 1702, the device may identify the corresponding operation mode selection value 1704. The device may use the identified operation mode selection value 1704 for determining the operation mode selection value for the device, such as in the determination of the operation mode of 1412 (FIG. 4), the redetermination of the operation mode of 1508 (FIG. 5), and/or the determination of the operation mode 1606 (FIG. 6). For example, the device may operate in two operation modes (such as the relay operation mode and the end point operation mode), where the identified operation mode selection value 1704 may correspond to one of the operation modes. In response to the device drawing a value (as described in relation to 1412 (FIG. 4)) less than, or within the range of, the identified operation mode selection value 1704, the device may determine that the operation mode for the device is to be the one of the operation modes. Whereas, in response to the device drawing a value greater than, or outside of the range of, the identified operation mode selection value 1704, the device may determine that the operation mode for the device 1006 is the other of the operation modes.

Figure 8:
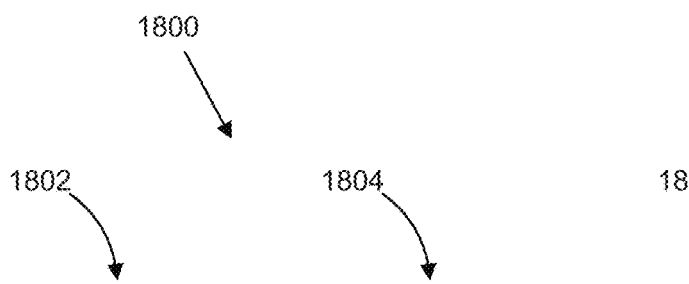
FIG. 8 illustrates another example operation mode selection table with current operation mode accounting, according to various embodiments.

FIG. 8 illustrates another example operation mode selection table 1800 with current operation mode accounting, according to various embodiments. The operation mode selection table 1800 may include one or more of the features of the operation mode selection table 1700 (FIG. 7) and may be generated and/or transmitted in a same manner as the operation mode selection table 1700.

The operation mode selection table 1800 may include one or more ranks 1802. The ranks 1802 may correspond to the ranks 1014 (FIG. 1) within the network 1000 (FIG. 1). Further, the table 1800 may include multiple operation mode selection values corresponding to each of the ranks 1802. The multiple operation mode selection values may include operation mode selection values corresponding to each of the possible operation modes that the one or more devices 1006 (FIG. 1) may operate within, or some portion thereof. The illustrated example shows two operation mode selection values associated with each of the ranks 1802 for simplicity, although, it is to be understood that there may be more than two operation mode selection values associated with each of the ranks 1802.

The multiple selection mode values may include first operation selection mode values 1804 that correspond to a first possible current operation mode (the relay operation mode in the illustrated example) of the devices 1006 and second operation mode selection mode values 1806 that correspond to a second possible current operation mode (the end point operation mode in the illustrated example) of the devices 1006. The first operation mode selection values 1804 and the second operation mode selection values 1806 may each be associated with a certain operation mode for the devices 1006. While the illustrated embodiment has a single first operation mode selection value 1804 and a single second operation mode selection value 1806 associated with each of the ranks 1802, it is to be understood that the first operation mode selection values 1804 and/or the second operation mode selection values 1806 associated with each of the ranks 1802 may include a range of values associated with the certain operation mode rather than a single value.

In response to identifying the table 1800 or the data include within the table 1800 (collectively referred to as 'the table data' in the description of FIG. 8) transmitted by the leader of the network 1000, a device, of the devices 1006, may identify the rank 1802 within the table data corresponding to the rank, of the ranks 1014, of the device. Based on the identified rank 1802, the device 1006 may identify the first operation mode selection values 1804 and the second operation mode selection values 1806 associated with the identified rank 1802. The device may select between the first operation mode selection values 1804 and the second operation mode selection values 1806 based on the operation mode in which the device is currently operating. For example, if the device is currently operating in the relay operation mode, then the device may select the first operation mode selection values 1804 corresponding to the relay operation mode. Whereas, if the device is currently operating in the end point operation mode, then the device may select the second operation mode selection values 1806 corresponding to the end point operation mode. The device may use the identified operation mode selection value 1804 for determining the operation mode for the device, such as in the determination of the operation mode of 1412 (FIG. 4), the redetermination of the operation mode of 1508 (FIG. 5), the determination of the operation mode 1606 (FIG. 6), or the determination of the operation mode described in relation to FIG. 7.

Figure 9:
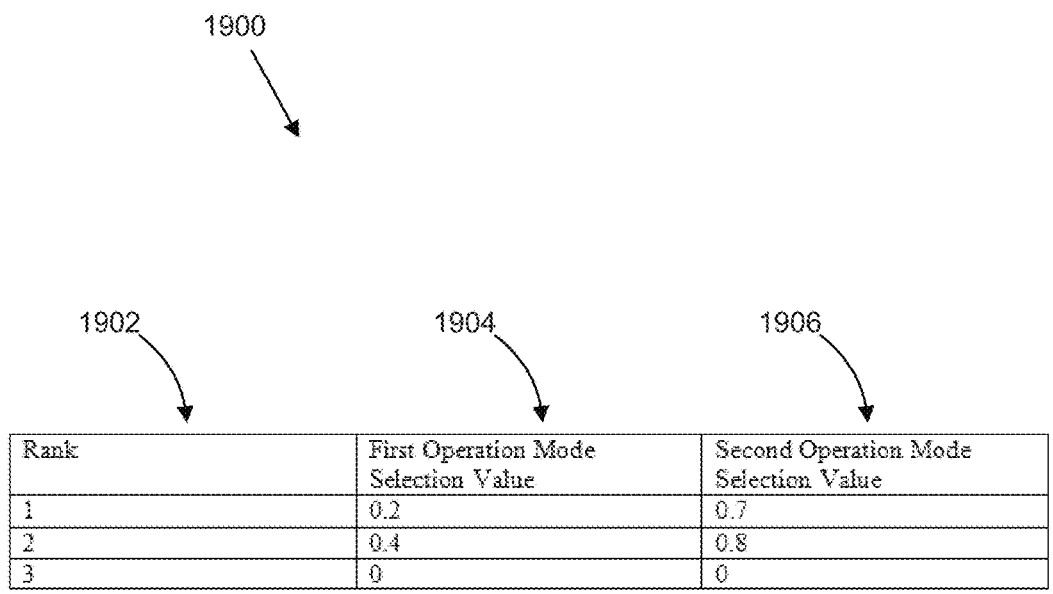
FIG. 9 illustrates another example operation mode selection table with multiple operation modes, according to various embodiments.

FIG. 9 illustrates another example operation mode selection table 1900 with multiple operation modes, according to various embodiments. The operation mode selection table 1900 may include one or more of the features of the operation mode selection table 1700 (FIG. 7) and/or the operation mode selection table 1800 (FIG. 8), and may be generated and/or transmitted in a same manner as the operation mode selection table 1700 and/or the operation mode selection table 1800.

The operation mode selection table 1900 may include one or more ranks 1902. The ranks 1902 may correspond to the ranks 1014 (FIG. 1) within the network 1000 (FIG. 1). Further, the table 1900 may include multiple operation mode selection values corresponding to each of the ranks 1902. The multiple operation mode selection values may include operation mode selection values corresponding to each of the possible operation modes that the one or more devices 1006 (FIG. 1) may operate within, or some portion thereof. The illustrated example shows two operation mode selection values associated with each of the ranks 1902 for simplicity, although, it is to be understood that there may be more than two operation mode selection values associated with each of the ranks 1902.

The multiple selection mode values may include first operation selection mode values 1904 that correspond to a first operation mode for the devices 1006 and second operation mode selection mode values 1906 that correspond to a second operation mode for the devices 1006. While the illustrated embodiment has a single first operation mode selection value 1904 and a single second operation mode selection value 1906 associated with each of the ranks 1902, it is to be understood that the first operation mode selection values 1904 and/or the second operation mode selection values 1906 associated with each of the ranks 1902 may include a range of values associated with the first operation mode for the devices 1006 and a range of values associated with the second operation mode for the devices 1006, respectively.

In response to identifying the table 1900 or the data included within the table 1900 (collectively referred to as 'the table data' in the description of FIG. 9) transmitted by the leader of the network 1000, a device, of the devices 1006, may identify the rank 1902 within the table data corresponding to the rank 1014 of the device. Based on the identified rank 1902, the device may identify the first operation mode selection values 1904 and the second operation mode section values 1906 associated with the identified rank 1902.

The device may use the identified operation mode selection value 1904 for determining the operation mode for the device, such as in the determination of the operation mode of 1412 (FIG. 4), the redetermination of the operation mode of 1508 (FIG. 5), the determination of the operation mode 1606 (FIG. 6), the determination of the operation mode described in relation to FIG. 7, or the determination of the operation mode described in relation to FIG. 8.

In particular, the device may draw a value (as described in relation to 1412 (FIG. 4)) and may compare the drawn value to the identified first operation mode selection values 1904 and the identified second operation mode selection values 1906. If, based on the comparison, the device determines that the drawn value is less than, or within a range of, the first operation mode selection values 1904, the device may determine the operation mode for the device is an operation mode corresponding to the first operation mode selection values 1904. If, based on the comparison, the device determines that the drawn value is greater than the first operation mode selection values 1904 and less than the second operation mode selection values 1906, or within a range of the second operation mode selection values 1906, the device may determine the operation mode for the device is an operation mode corresponding to the second operation mode selection values 1906. If, based on the comparison, the device determines that the drawn value is greater than the second operation mode selection values 1906, or outside of the ranges of the first operation mode selection values 1904 and the second mode selection values 1906, the device may determine the operation mode for the device is a third operation mode, different from the operation modes corresponding to the first operation mode selection values 1904 and the second operation mode selection values 1906.

Figure 10:
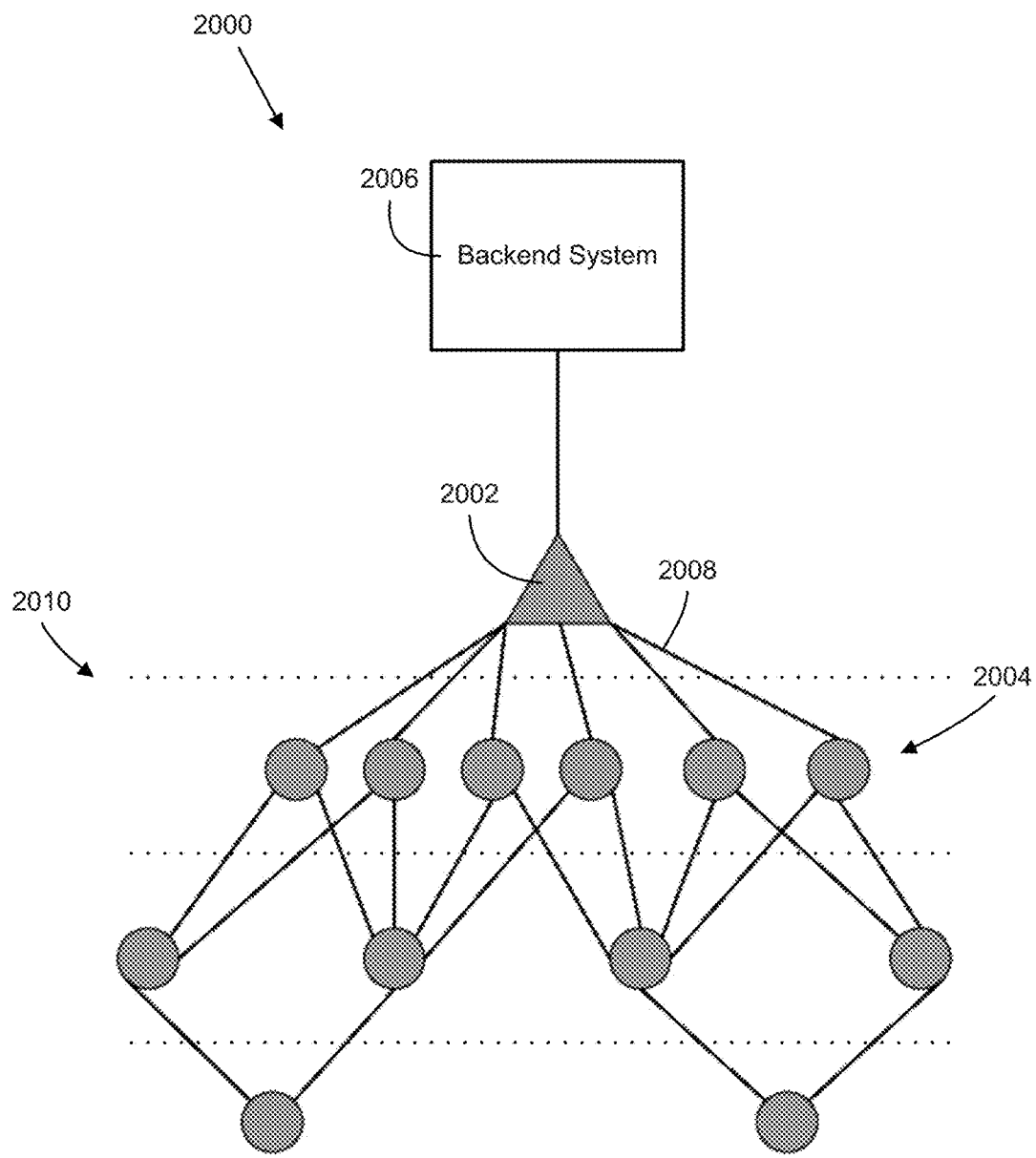
FIG. 10 illustrates an example wireless mesh network initialization configuration, according to various embodiments.

FIG. 10 illustrates an example wireless mesh network initialization configuration 2000, according to various embodiments. The wireless mesh network initialization configuration 2000 may include a gateway 2002 and one or more devices 2004 (denoted by circles in FIG. 10) coupled to the gateway 2002. The gateway 2002 may include one or more of the features of the gateway 2004 (FIG. 1). The one or more devices 2004 may include one or more of the features of the devices 1006 (FIG. 1). Further, the wireless mesh network initialization configuration 2000 may include a backend system 2006 coupled to the gateway 2002. The backend system 2006 may include one or more of the features of the backend system 1002 (FIG. 1). The wireless mesh network initialization configuration 2000 may be implemented at initialization of the network illustrated.

At initialization of the network, the leader of the network (such as the leader described in relation to FIG. 1) may not have adequate information to generate operation mode selection values based on the information and/or may not have queried the devices 2004 for the information. Based on the leader not having adequate information, the leader may set all the operation mode selection values to values that cause all the devices 2004 to enter the relay operation mode. When all the devices 2004 enter the relay operation mode, the devices 2004 may establish links 2008 with the other devices 2004 adjacent to the devices 2004 that the devices 2004 detect. The devices 2004 may establish the links 2008 with other devices 2004 within the same rank 2010 and/or within different ranks 2010 (separation between the ranks 2010 denoted by dotted lines in FIG. 10). Placing all the devices 2004 in relay operation mode may ensure that all the devices 2004 are connected within the network and may assist in obtaining information by the devices 2004 and/or the leader for further configuration of the network.

After initialization of the network in the wireless mesh network initialization configuration 2000 with all the devices 2004 in relay operation mode, the one or more of the devices 2004 may initiate the information acquisition procedure 1300 (FIG. 3) to generate information that may be utilized by the leader in generating or updating the operation mode selection values. The leader may then initiate the operation mode selection value generation procedure 1200 (FIG. 2) to generate or update the operation mode selection values. Subsequent to the leader completing the operation mode selection value generation procedure 1200, the devices 2004 may perform and/or complete the operation mode redetermination procedure 1500 (FIG. 5) to enter updated operation modes. In response to performance of one or more of the operation mode redetermination procedures 1500, the network may be reconfigured to the network 1000 (FIG. 1), with the devices 2004 and the links 2008 being in the same operation modes and establishing the same connections as the devices 1006 and the links 1012 (FIG. 1). The network 1000 may be the optimized configuration of the network of FIG. 10 in accordance with embodiments described herein.

In other embodiments, the devices 2004 may all enter the relay operation mode at initialization of the network based on default initialization operation modes of the devices 2004 rather than in response to the leader providing the operation mode selection values that cause the devices 2004 to enter the relay mode operation at initialization. The default initialization operation modes of the devices 2004 may be pre-configured, and may be stored and/or indicated within memory of each of the individual devices 2004 and the devices 2004 may automatically enter the relay operation mode in response to detecting the network being initialized. Further, in some embodiments, a first portion of the devices 2004 may be pre-configured with a default initialization operation mode of the relay operation mode, while a second portion of the devices 2004 may be pre-configured with a default initialization operation mode of the end point operation mode.

Further, in some embodiments, the devices 2004 may perform the operation mode entry procedure 1600 (FIG. 6) in addition to, or in lieu of, the leader generating or updating the operation mode selection values based on the information obtained from the devices 2004 after initialization. The devices 2004 may, regardless of the current values of the operation mode selection values or updates to the operation mode selection values, reconfigure the network to the network 1000 (FIG. 1) without assistance from the leader.

Still further, in some embodiments, the leader may have or acquire information to adequately generate the operation mode selection values at the initialization of the network. The leader may use information from a prior instantiation of the network to generate the operation mode selection values at the initialization of the network. In other embodiments, the information may be provided to the leader by an administrator of the network, the backend system 2006, a user of the network, and/or a user of one of the devices 2004 within the network. In these embodiments, the devices 2004 may enter operation modes corresponding to the operation mode selection values at initialization rather than all the devices 2004 entering the relay operation mode at initialization of the network.

Figure 11:
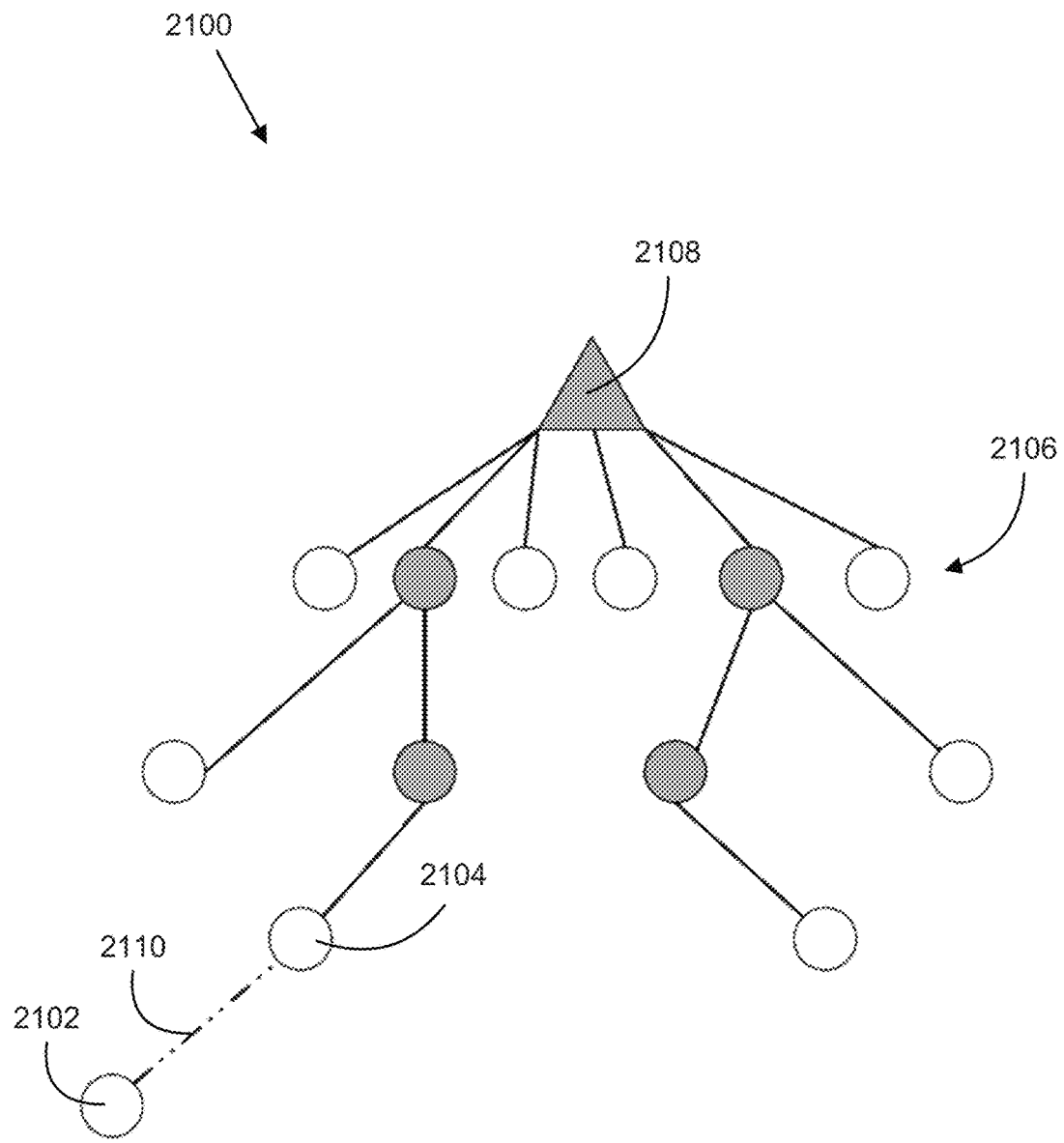
FIG. 11 illustrates an example wireless mesh network with an orphaned device, according to various embodiments.

FIG. 11 illustrates an example wireless mesh network 2100 with an orphaned device 2102, according to various embodiments. The network 2100 may include one or more of the features of the network 1000 (FIG. 1).

The orphaned device 2102 may have been orphaned by the parent device 2104 transitioning from the relay operation mode to the end point operation mode, where the orphaned device 2102 had a link, such as the links 1012 (FIG. 1) with parent device 2104 when in the relay operation mode that was terminated when the parent device 2104 transitioned to the end point operation mode. The parent device 2104 may have transitioned in response to performance of the operation mode redetermination procedure 1500 (FIG. 5), changes to the network 2100, a battery level and/or a battery energy of the parent device 2104 dropping below a threshold value, or some combination thereof.

In response to determining that the link with the parent device 2104 has been terminated, the orphaned device 2102 may initiate the network association procedure 1400 (FIG. 4) in an attempt to discover another one of the devices 2106 (the devices 2106 denoted by circles in FIG. 11) within the network 2100 or the gateway 2108 to establish a link with. If the orphaned device 2102 discovers another one of the devices 2106 or the gateway 2108 to establish a link with, the orphaned device 2102 may establish the link and may be connected to the network via the other one of the devices 2106 or the gateway 2108. Accordingly, the orphaned device 2102 may no longer be orphaned.

However, if the orphaned device 2102 does not discover another one of the devices 2106 or the gateway 2108 to establish a link with (as is illustrated in FIG. 11), the orphaned device 2102 may remain orphaned after performance of the network association procedure 1400. In this situation, the orphaned device 2102 may transmit a message to the parent device 2104, or any other neighboring device, requesting information that can be used to establish a link 2110 with the parent device 2104. The orphaned device 2102 may continue to retransmit the message requesting the link 2110 and may remain in an active mode until a response is received from the parent device 2104.

As described throughout this disclosure, the parent device 2104 may be in an active mode for limited periods of time when the parent device 2104 has entered the end point operation mode. While in the active mode, the parent device 2104 may receive messages from the orphaned device 2102. The parent device 2104 may identify the message requesting the link 2110 during one of the limited periods of time the parent device 2104 is in the active mode.

In response to identifying the message, the parent device 2104 may transmit a response to the orphaned device 2102 that indicates time periods and/or a frequency at which the parent device 2104 is in the active mode. The orphaned device 2102 may receive the response and identify the time periods and/or the frequency within the message. Based on the time periods and/or the frequency, the orphaned device 2102 may establish the link 2110 with the parent device 2104, the link 2110 being available for communication during the time periods and/or at the frequency. Based on the link 2110 being established, the orphaned device 2102 may schedule transmissions and listen for communications during the time periods and/or at the frequency that the link 2110 is available.

In some embodiments, the parent device 2104 may transition into relay operation mode in response to identifying the message requesting the link 2110 from the orphaned device 2102. In some of these embodiments, the orphaned device 2102 may continue to attempt to discover another one of the devices 1006 with which to establish a link while the link 2110 is established with the parent device 2104. If the orphaned device 2102 discovers another one of the devices 1006 with which to establish a link, the orphaned device 2102 may establish a link with the other device and terminate the link 2110 with the parent device 2104, allowing the parent device 2104 to transition back into the end point operation mode.

Figure 12:
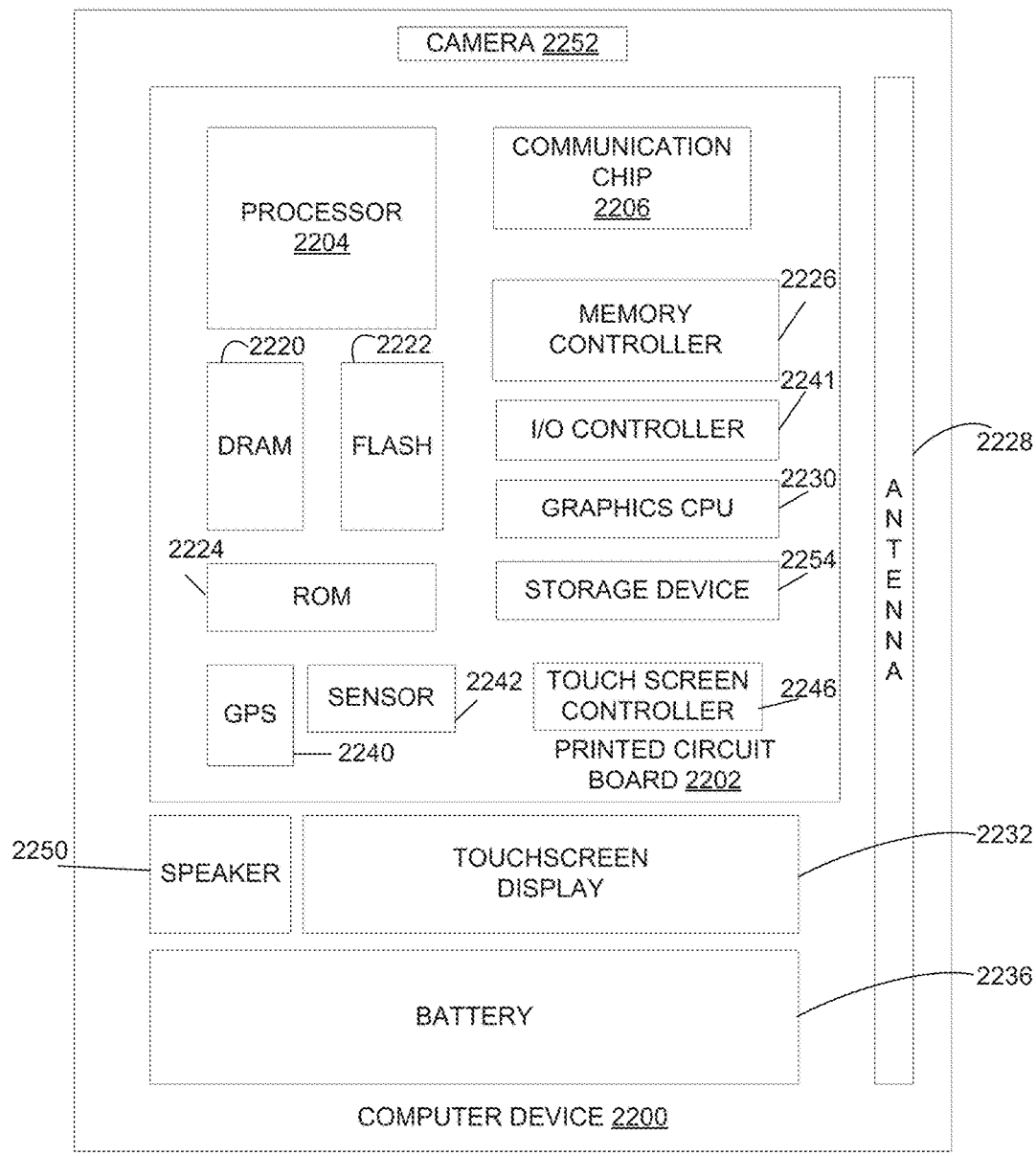
FIG. 12 illustrates an example computer device that may employ the apparatuses and/or methods described herein.

FIG. 12 illustrates an example computer device 2200 that may employ the apparatuses and/or methods described herein (e.g., the gateway 1004, the devices 1006, the operation mode selection value generation procedure 1200, the information acquisition procedure 1300, the network association procedure 1400, the operation mode redetermination procedure 1500, the generation mode entry procedure 1600, the gateway 2002, and the devices 1004), in accordance with various embodiments. As shown, computer device 2200 may include a number of components, such as one or more processor(s) 2204 (one shown) and at least one communication chip 2206. In various embodiments, the one or more processor(s) 2204 each may include one or more processor cores. In various embodiments, the at least one communication chip 2206 may be physically and electrically coupled to the one or more processor(s) 2204. In further implementations, the communication chip 2206 may be part of the one or more processor(s) 2204. In various embodiments, computer device 2200 may include printed circuit board (PCB) 2202. For these embodiments, the one or more processor(s) 2204 and communication chip 2206 may be disposed thereon. In alternate embodiments, the various components may be coupled without the employment of PCB 2202.

Depending on its applications, computer device 2200 may include other components that may or may not be physically and electrically coupled to the PCB 2202. These other components include, but are not limited to, memory controller 2226, volatile memory (e.g., dynamic random access memory (DRAM) 2220), non-volatile memory such as read only memory (ROM) 2224. In still other embodiments, computer device 2200 may further include one or more optional components, such as flash memory 2222, storage device 2254 (e.g., a hard-disk drive (HDD)), an I/O controller 2241, a digital signal processor (not shown), a crypto processor (not shown), a graphics processor 2230, one or more antenna 2228, a display (not shown), a touch screen display 2232, a touch screen controller 2246, a battery 2236, an audio codec (not shown), a video codec (not shown), a global positioning system (GPS) device 2240, a sensor 2242, an accelerometer (not shown), a gyroscope (not shown), a speaker 2250, a camera 2252, a mass storage device (such as hard disk drive, a solid state drive, compact disk (CD), digital versatile disk (DVD)) (not shown), and so forth.

In some embodiments, the one or more processor(s) 2204, flash memory 2222, and/or storage device 2254 may include associated firmware (not shown) storing programming instructions configured to enable computer device 2200, in response to execution of the programming instructions by one or more processor(s) 2204, to practice all or selected aspects of the methods described herein. In various embodiments, these aspects may additionally or alternatively be implemented using hardware separate from the one or more processor(s) 2204, flash memory 2222, or storage device 2254.

In some embodiments, the one or more processor(s) 2204, the flash memory 2222, the ROM 2224, the memory controller 2226, and/or storage device 2254 may be referred to as a controller of the computer device 2200. The controller may perform one or more of the operations and/or procedures described throughout this disclosure, including, but not limited to, the operation mode selection value generation procedure 1200, the information acquisition procedure 1300, the network association procedure 1400, the operation mode redetermination procedure 1500, the operation mode entry procedure 1600, or some combination thereof. The controller may be coupled to the wireless circuitry, and may perform operations on data received via the wireless circuitry and/or request transmission of data via the wireless circuitry.

The communication chips 2206 may enable wired and/or wireless communications for the transfer of data to and from the computer device 2200. The communication chips 2206 and/or circuitry coupled to the communication chips 2206 that support wireless communication (which may include the antenna 2228) may be referred to as wireless circuitry. The wireless circuitry may allow the computer device 2200 to communicate with elements within a network (such as network 1000 (FIG. 1)), including other computer devices, gateways, and/or leaders of the network. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 2206 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 2200 may include a plurality of communication chips 2206. For instance, a first communication chip 2206 may be dedicated to shorter range wireless communications such as Wi-Fi and Bluetooth, and a second communication chip 2206 may be dedicated to longer range wireless communications such as GPS, EDGE, GPRS, CDMA, WiMAX, LTE, Ev-DO, and others.

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

In various implementations, the computer device 2200 may be an IoT device, a gateway, a switch, a router, a laptop, a netbook, a notebook, an ultrabook, a smartphone, a computer tablet, a personal digital assistant (PDA), an ultramobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computer device 2200 may be any other electronic device that processes data.

Figure 13:
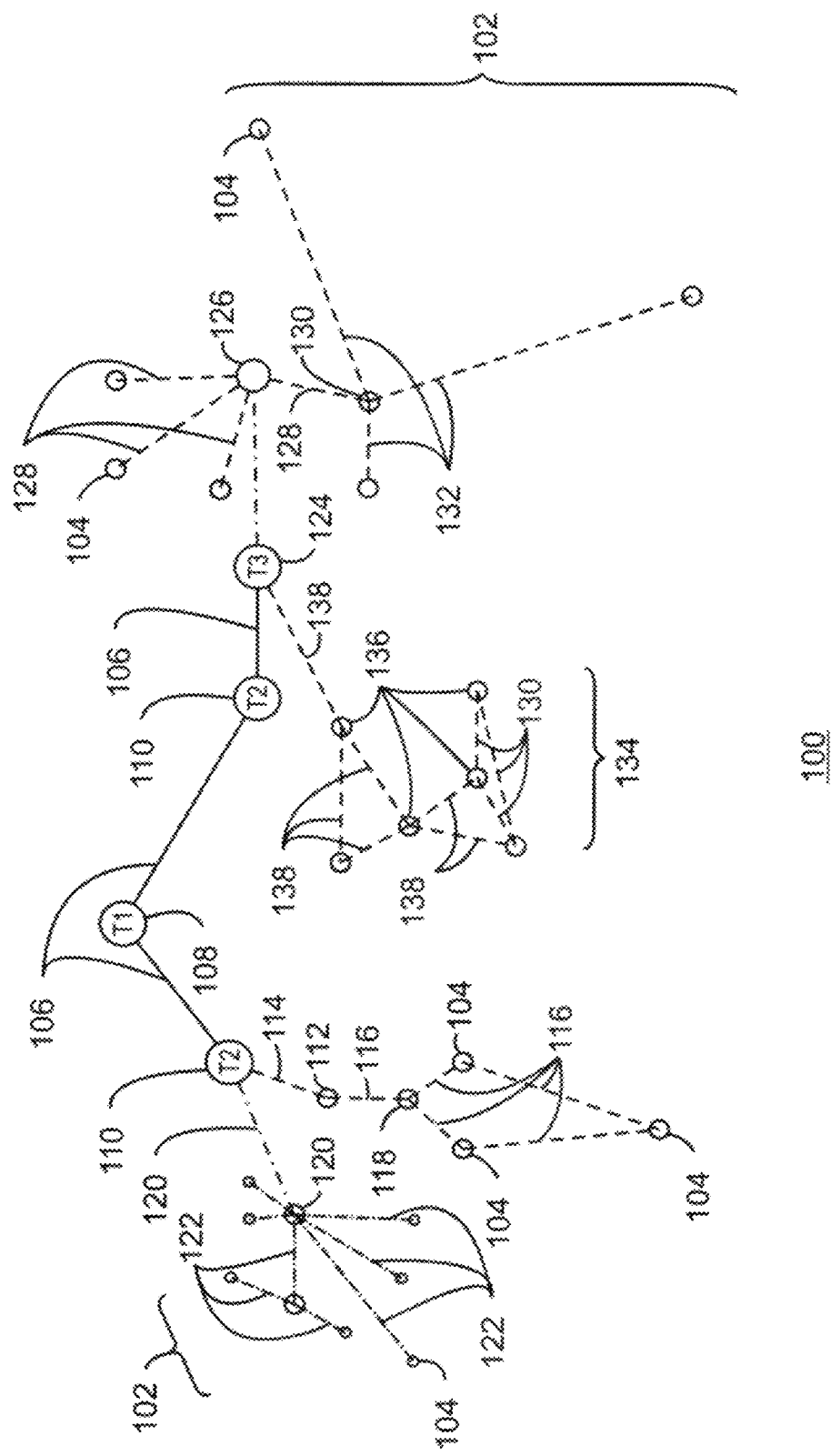
FIG. 13 is a simplified drawing of interconnections that may be present between the Internet and IoT networks.

FIG. 13 is a simplified drawing of interconnections that may be present between the Internet 100 and IoT networks. In some embodiments, the IoT networks may include one or more of the network 1000 (FIG. 2), the network 2100 (FIG. 11), or some combination thereof. The interconnections may couple smaller networks 102, down to the individual IoT device 104, to the fiber backbone 106 of the Internet 100. To simplify the drawing, not every device 104, or other object, is labeled. In some embodiments, the IoT devices 104 may include one or more of the devices 1006 (FIG. 1), the devices 2004 (FIG. 10), the orphaned device 2102 (FIG. 11), the parent device 2104 (FIG. 11), the devices 2106 (FIG. 11), or some combination thereof.

In the simplified drawing, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. In some embodiments, the LTE communication link 116 may include one or more of the links 1012 (FIG. 1), the links 2008 (FIG. 10), the links 2110 (FIG. 11), or some combination thereof. The communications between the individual IoT devices 104 may also be based on LTE communication links 116. In some embodiments, the tower 112 may include one or more of the gateway 1004 (FIG. 1), the gateway 2002 (FIG. 10), the gateway 2108 (FIG. 11), or some combination thereof.

In another example, a high-speed uplink 120 may couple a tier 2 provider 110 to a gateway 120. In some embodiments, the gateway 120 may include one or more of the gateway 1004 (FIG. 1), the gateway 2002 (FIG. 10), the gateway 2108 (FIG. 11), or some combination thereof. A number of IoT devices 104 may communicate with the gateway 120, and with each other through the gateway 120, for example, over Bluetooth low energy (BLE) links 122. In some embodiments, the BLE links 122 may include one or more of the links 1012 (FIG. 1), the links 2008 (FIG. 10), the links 2110 (FIG. 11), or some combination thereof.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate gateway 126 and other customers. In some embodiments, the corporate gateway 126 may include one or more of the gateway 1004 (FIG. 1), the gateway 2002 (FIG. 10), the gateway 2108 (FIG. 11).

From the corporate gateway 126, a wireless local area network (WLAN) can be used to communicate with IoT devices 104 through Wi-Fi® links 128. In some embodiments, the Wi-Fi links 128 may include one or more of the links 1012 (FIG. 1), the links 2008 (FIG. 10), the links 2110 (FIG. 11), or some combination. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance. In some embodiments, the LPWA gateway may include one or more of the gateway 1004 (FIG. 1), the gateway 2002 (FIG. 10), the gateway 2108 (FIG. 11), or some combination thereof. Further, in some embodiments, the LPWA links 132 may include one or more of the links 1012 (FIG. 1), the links 2008 (FIG. 10), the links 2110 (FIG. 11), or some combination thereof.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices. In some embodiments, the mesh network 134 may include one or more of the network 1000 (FIG. 1), the network 2100 (FIG. 11), or some combination thereof. In some embodiments, the coordinator device 136 may include one or more of the devices 1006 (FIG. 1), the devices 2004 (FIG. 10), the orphaned device 2102 (FIG. 11), the parent device 2104 (FIG. 11), the devices 2106 (FIG. 11), or some combination thereof (referred to as 'the devices' in reference to the coordinator device 136). The devices may operate in relay operation mode when included within the coordinator device 136. Further, in some embodiments, the LTE cellular link, the LPWA link, and/or the link 138 may include the links 1012 (FIG. 1), the links 2008 (FIG. 10), the links 2110 (FIG. 11), or some combination thereof.

It may be clear that each of the IoT devices 104 include the appropriate transceiver for the communications with that device. Further, each device 104 may include other transceivers for communications using additional protocols and frequencies. This is discussed further with respect to FIG. 8.

The technologies and networks may enable the exponential growth of devices and networks. As the technologies grows, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 14:
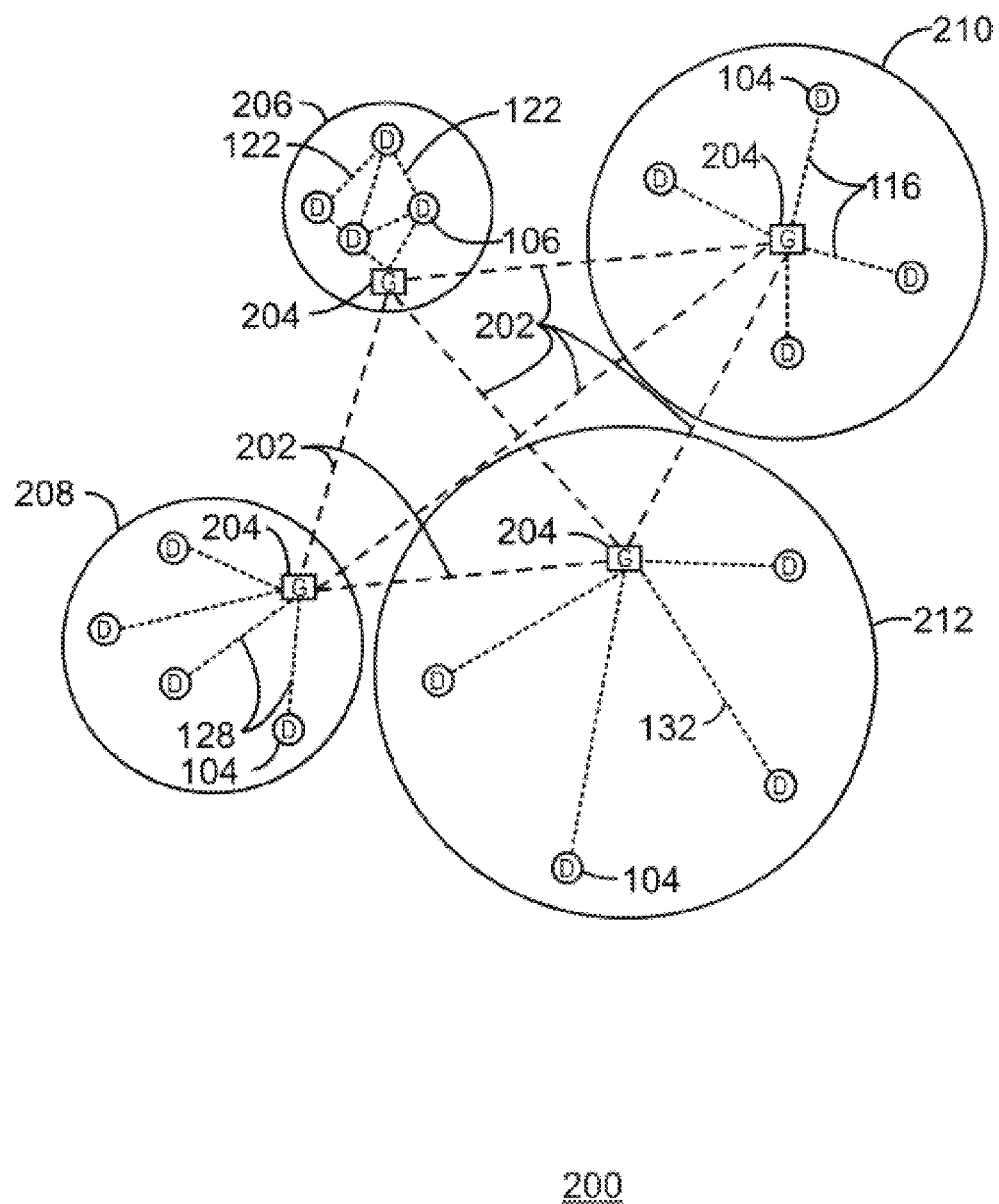
FIG. 14 is a simplified drawing of a domain topology that may be used for a number of internet-of-things (IoT) networks coupled through backbone links to gateways.

FIG. 14 is a simplified drawing of a domain topology 200 that may be used for a number of internet-of-things (IoT) networks coupled through backbone links 202 to gateways 204. In some embodiments, the gateways 2014 may include one or more of the gateway 1004 (FIG. 1), the gateway 2002 (FIG. 10), the gateway 2108 (FIG. 11), or some combination thereof. Like numbered items are as described with respect to FIG. 13. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

The network topology 200 may include any number of types of IoT networks, such as a mesh network 206 using BLE links 122. In some embodiments, the mesh network 206 may include one or more of the network 1000 (FIG. 1), the network 2100 (FIG. 11), or some combination thereof. Other IoT networks that may be present include a WLAN network 208, a cellular network 210, and an LPWA network 212. In some embodiments, the other IoT networks may include one or more of the network 1000 (FIG. 1), the network 2100 (FIG. 11), or some combination thereof. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 15:
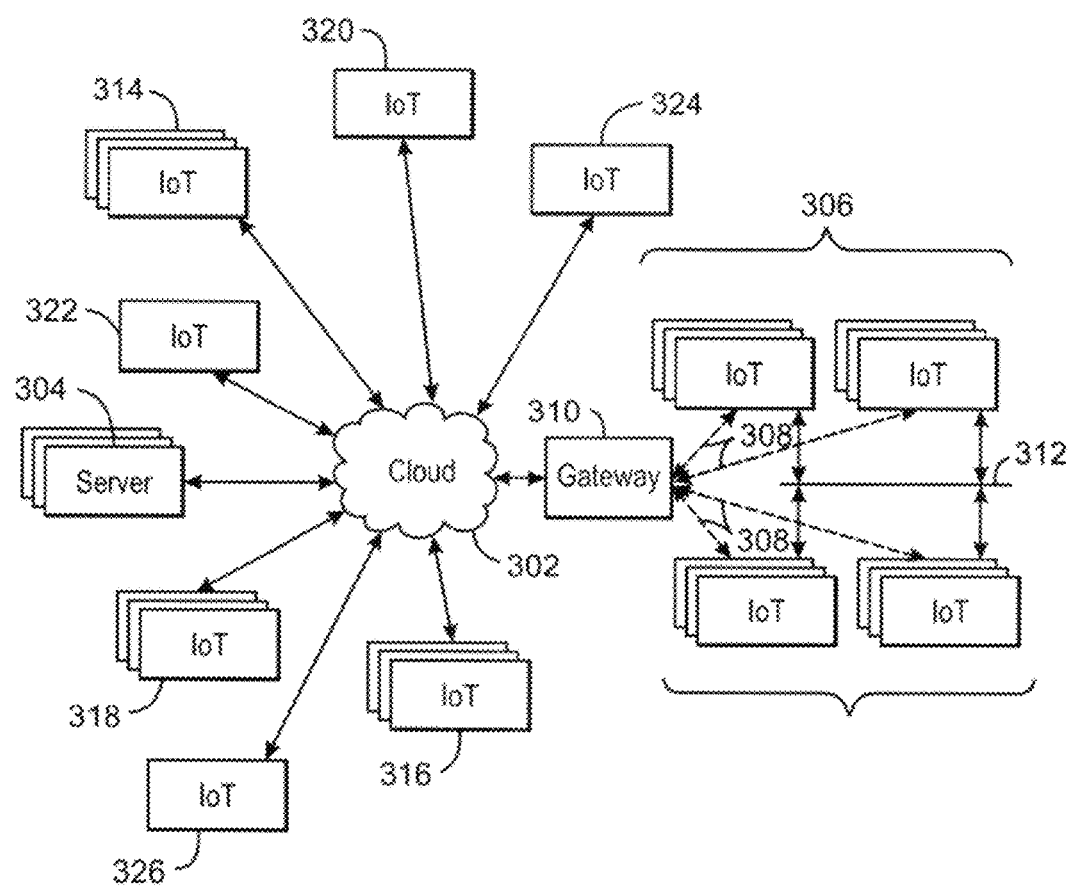
FIG. 15 is a drawing of a cloud computing network, or cloud, in communication with a number of Internet of Things (IoT) devices.

FIG. 15 is a drawing of a cloud computing network, or cloud 302, in communication with a number of Internet of Things (IoT) devices. In some embodiments, the cloud 302 may include one or more of the backend system 1002 (FIG. 1), the backend system 2006 (FIG. 10), or some combination thereof. Further, in some embodiments, the IoT devices may include one or more of the devices 1006 (FIG. 1), the devices 2004 (FIG. 1), the orphaned device 2102 (FIG. 11), the parent device 2104 (FIG. 11), the devices 2106 (FIG. 11), or some combination thereof. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. In some embodiments, the wireless links 308 may include one or more of the links 1012 (FIG. 1), the links 2008 (FIG. 10), the links 2110 (FIG. 11), or some combination thereof. Further, a wired or wireless sub-network 312 may allow the IoT devices to communicate with each other, such as through a local area network, a wireless local area network, and the like. In some embodiments, the sub-network 312 may include one or more of the network 1000 (FIG. 1), the network 2100 (FIG. 11), or some combination thereof. The IoT devices may use another device, such as a gateway 310 to communicate with the cloud 302. In some embodiments, the gateway 310 may include one or more of the gateway 1004 (FIG. 1), the gateway 2002 (FIG. 10), the gateway 2108 (FIG. 11), or some combination thereof.

Other groups of IoT devices may include remote weather stations 314, local information terminals 316, alarm systems 318, automated teller machines 320, alarm panels 322, or moving vehicles, such as emergency vehicles 324 or other vehicles 326, among many others. In some embodiments, the IoT devices may include one or more of the devices 1006 (FIG. 1), the devices 2004 (FIG. 10), the orphaned device 2102 (FIG. 11), the parent device 2104 (FIG. 11), the devices 2106 (FIG. 11), or some combination thereof. Each of these IoT devices may be in communication with other IoT devices, with servers 304, or both.

As can be seen from FIG. 15, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. This is discussed further with respect to FIG. 16.

Figure 16:
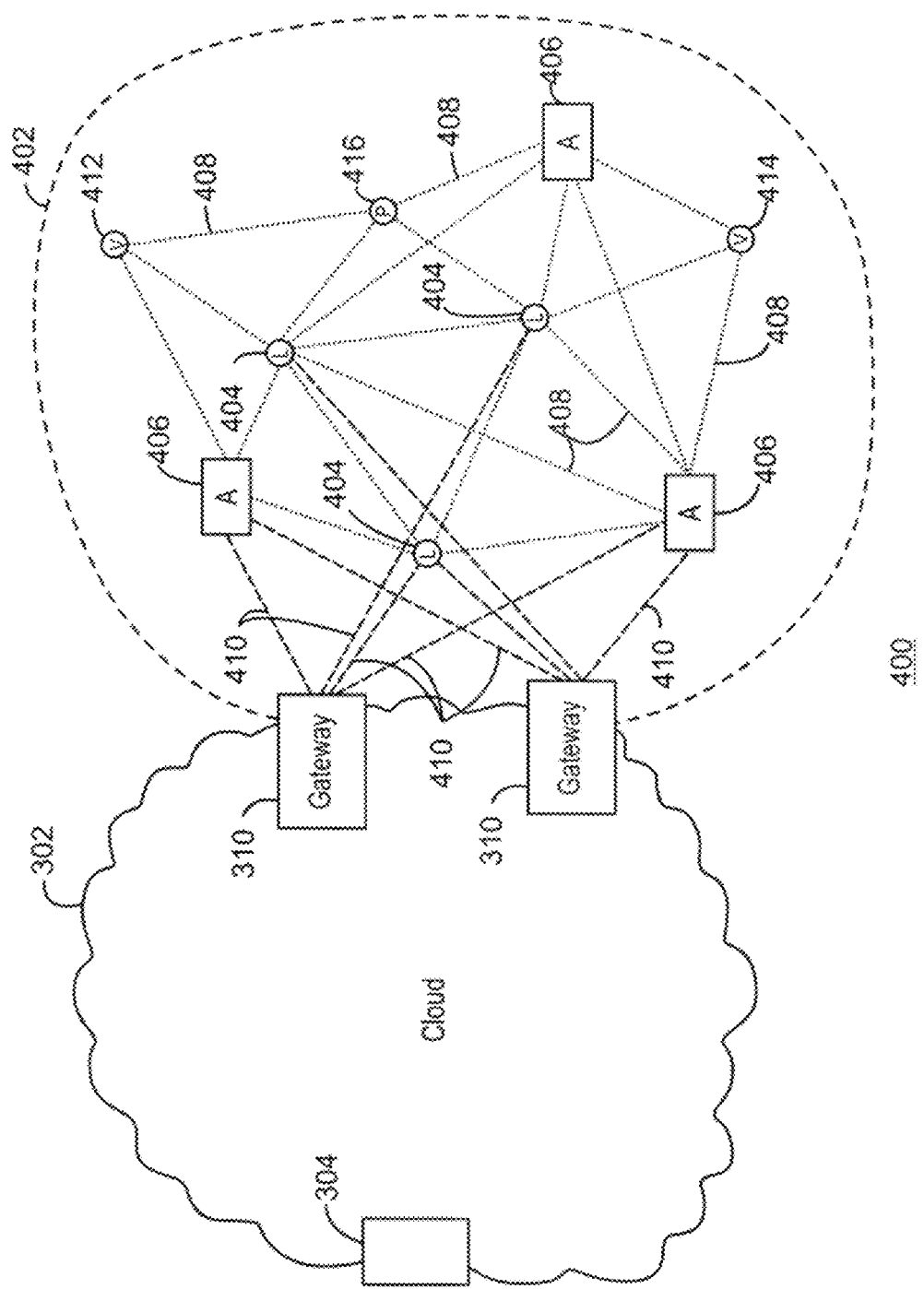
FIG. 16 is a drawing of a cloud computing network, or cloud, in communication with a mesh network of IoT devices, which may be termed a fog device, operating at the edge of the cloud.

FIG. 16 is a drawing 400 of a cloud computing network, or cloud 302, in communication with a mesh network of IoT devices, which may be termed a fog device 402, operating at the edge of the cloud 302. Like numbered items are as described with respect to FIG. 3. In this example, the fog device 402 is a group of IoT devices at an intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example.

Traffic flow through the intersection may be controlled by three traffic lights 404. Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network. In some embodiments, the gateways 310 may include one or more of the gateway 1004 (FIG. 1), the gateway 2002 (FIG. 10), the gateway 2108 (FIG. 11), or some combination thereof.

Any number of communications links may be used in the fog device 402. In some embodiments, the communication links may include the links 1012 (FIG. 1), the links 2008 (FIG. 10), the links 2110 (FIG. 11), or some combination thereof. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communications link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

Communications from any IoT device may be passed along the most convenient path between any of the IoT devices to reach the gateways 310. In these networks, the number of interconnections provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416.

The fog device 402 of the devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if an IoT device fails, other IoT devices may be able to discover and control a resource. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404.

As the transient devices 412, 414, and 416, leave the vicinity of the intersection the fog device 402, it may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs using resources from the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 17:
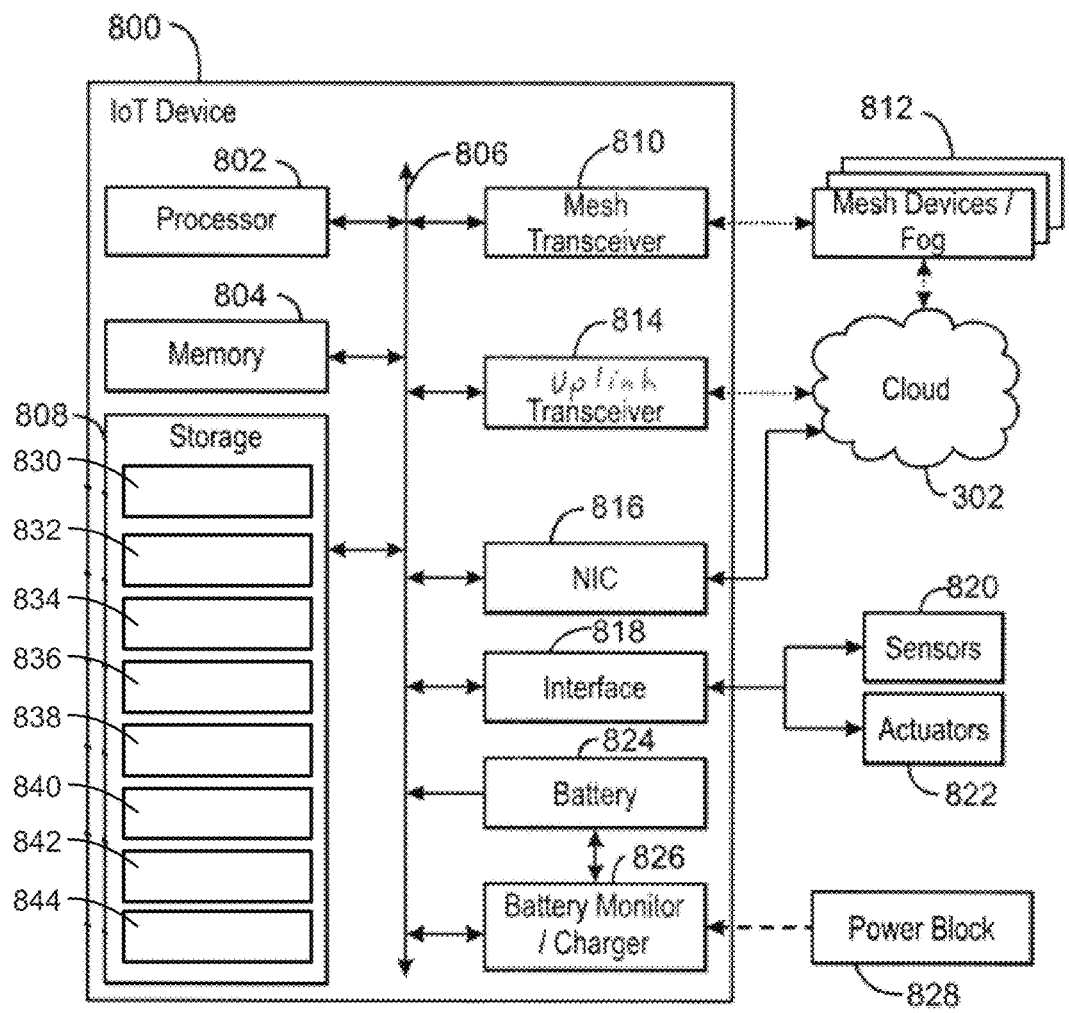
FIG. 17 is a block diagram of an example of components that may be present in an IoT device for offloading data.

FIG. 17 is a block diagram of an example of components that may be present in an IoT device 800 for offloading data. In some embodiments, the devices 1006 (FIG. 1), the devices 2004 (FIG. 10), the orphaned device 2102 (FIG. 11), the parent device 2104 (FIG. 11), the devices 2106 (FIG. 11), or some combination thereof, may be implemented by one or more of the IoT devices 800. The IoT device 800 may include any combinations of the components shown in the example. The components may be implemented as ICs, portions thereof, discrete electronic devices, or other modules, logic, hardware, software, firmware, or a combination thereof adapted in the IoT device 800, or as components otherwise incorporated within a chassis of a larger system. The block diagram of FIG. 17 is intended to show a high level view of components of the IoT device 800. However, some of the components shown may be omitted, additional components may be present, and different arrangement of the components shown may occur in other implementations.

The IoT device 800 may include a processor 802, which may be a microprocessor, a multi-core processor, a multi-threaded processor, an ultra-low voltage processor, an embedded processor, or other known processing element. The processor 802 may be a part of a system on a chip (SoC) in which the processor 802 and other components are formed into a single integrated circuit, or a single package, such as the Edison™ or Galileo™ SoC boards from Intel. As an example, the processor 802 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 802 may communicate with a system memory 804 over a bus 806. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 808 may also couple to the processor 802 via the bus 806. To enable a thinner and lighter system design the mass storage 808 may be implemented via a solid state disk drive (SSDD). Other devices that may be used for the mass storage 808 include flash memory cards, such as SD cards, microSD cards, xD picture cards, and the like, and USB flash drives. In low power implementations, the mass storage 808 may be on-die memory or registers associated with the processor 802. However, in some examples, the mass storage 808 may be implemented using a micro hard disk drive (HDD). Further, any number of new technologies may be used for the mass storage 808 in addition to, or instead of, the technologies described, such resistance change memories, phase change memories, holographic memories, or chemical memories, among others. For example, the IoT device 800 may incorporate the 3D XPOINT memories from Intel® and Micron®.

The components may communicate over the bus 806. The bus 806 may include any number of technologies, including industry standard architecture (ISA), extended ISA (EISA), peripheral component interconnect (PCI), peripheral component interconnect extended (PCIx), PCI express (PCIe), or any number of other technologies. The bus 806 may be a proprietary bus, for example, used in a SoC based system. Other bus systems may be included, such as an I2C interface, an SPI interface, point to point interfaces, and a power bus, among others.

The bus 806 may couple the processor 802 to a mesh transceiver 810, for communications with other mesh devices 812. The mesh transceiver 810 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 812. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 810 may communicate using multiple standards or radios for communications at different range. For example, the IoT device 800 may communicate with close devices, e.g., within about 10 meters, using a local transceiver based on BLE, or another low power radio, to save power. More distant mesh devices 812, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 810 may be incorporated into an MCU as an address directly accessible by the chip, such as in the Curie® units available from Intel.

An uplink transceiver 814 may be included to communicate with devices in the cloud 302. The uplink transceiver 814 may be LPWA transceiver that follows the IEEE 802.15.4, or IEEE 802.15.4g standards, among others. The IoT device 800 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 810 and uplink transceiver 814, as described herein. For example, the radio transceivers 810 and 812 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The radio transceivers 810 and 812 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 814, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 816 may be included to provide a wired communication to the cloud 302 or to other devices, such as the mesh devices 812. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 816 may be included to allow connect to a second network, for example, a NIC 816 providing communications to the cloud over Ethernet, and a second NIC 816 providing communications to other devices over another type of network.

The bus 806 may couple the processor 802 to an interface 818 that is used to connect external devices. The external devices may include sensors 820, such as accelerometers, level sensors, flow sensors, temperature sensors, pressure sensors, barometric pressure sensors, and the like. The interface 818 may be used to connect the IoT device 800 to actuators 822, such as power switches, valve actuators, an audible sound generator, a visual warning device, and the like.

While not shown, various input/output (I/O) devices may be present within, or connected to, the IoT device 800. For example, a display may be included to show information, such as sensor readings or actuator position. An input device, such as a touch screen or keypad may be included to accept input.

A battery 824 may power the IoT device 800, although in examples in which the IoT device 800 is mounted in a fixed location, it may have a power supply coupled to an electrical grid. The battery 824 may be a lithium ion battery, a metal-air battery, such as a zinc-air battery, an aluminum-air battery, a lithium-air battery, and the like.

A battery monitor/charger 826 may be included in the IoT device 800 to track the state of charge (SoCh) of the battery 820. The battery monitor/charger 826 may be used to monitor other parameters of the battery 824 to provide failure predictions, such as the state of health (SoH) and the state of function (SoF) of the battery 824. The battery monitor/charger 826 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 826 may communicate the information on the battery 824 to the processor 802 over the bus 806. The battery monitor/charger 826 may also include an analog-to-digital (ADC) convertor that allows the processor 802 to directly monitor the voltage of the battery 826 or the current flow from the battery 824. The battery parameters may be used to determine actions that the IoT device 800 may perform, such as transmission frequency, mesh network operation, sensing frequency, and the like.

A power block 828, or other power supply coupled to a grid, may be coupled with the battery monitor/charger 826 to charge the battery 824. In some examples, the power block 828 may be replaced with a wireless power receiver to obtain the power wirelessly, for example, through a loop antenna in the IoT device 800. A wireless battery charging circuit, such as an LTC4020 chip from Linear Technologies of Milpitas, Calif., among others, may be included in the battery monitor/charger 826. The specific charging circuits chosen depend on the size of the battery 824, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 808 may include a number of modules to implement the group creation functions described herein. Although shown as code blocks in the mass storage 808, it may be understood that any of the modules may be replaced with hardwired circuits, for example, built into an application specific integrated circuit (ASIC). The mass storage 808 may include a sub-object list 830 of atomic objects and composite objects that may be used to form a group object. A collection group identifier 832 may use the sub-object list 830 to generate a group id, for example, using a hash formula on the sub-object list 830.

The mass storage 808 may include a code block 834 to implement the operation mode selection value generation procedure 1200 (FIG. 2), a code block 836 to implement the device information acquisition procedure 1300 (FIG. 3), a code block 838 to implement the network association procedure 1400 (FIG. 4), a code block 840 to implement the operation mode determination procedure 1500 (FIG. 5), a code block 842 to implement the operation mode entry procedure 1600 (FIG. 6), or some combination thereof. In some embodiments, the mass storage 808 may include one or more code blocks 844 to implement one or more of the features, procedures, and/or examples (below) described throughout this disclosure.

Figure 18:
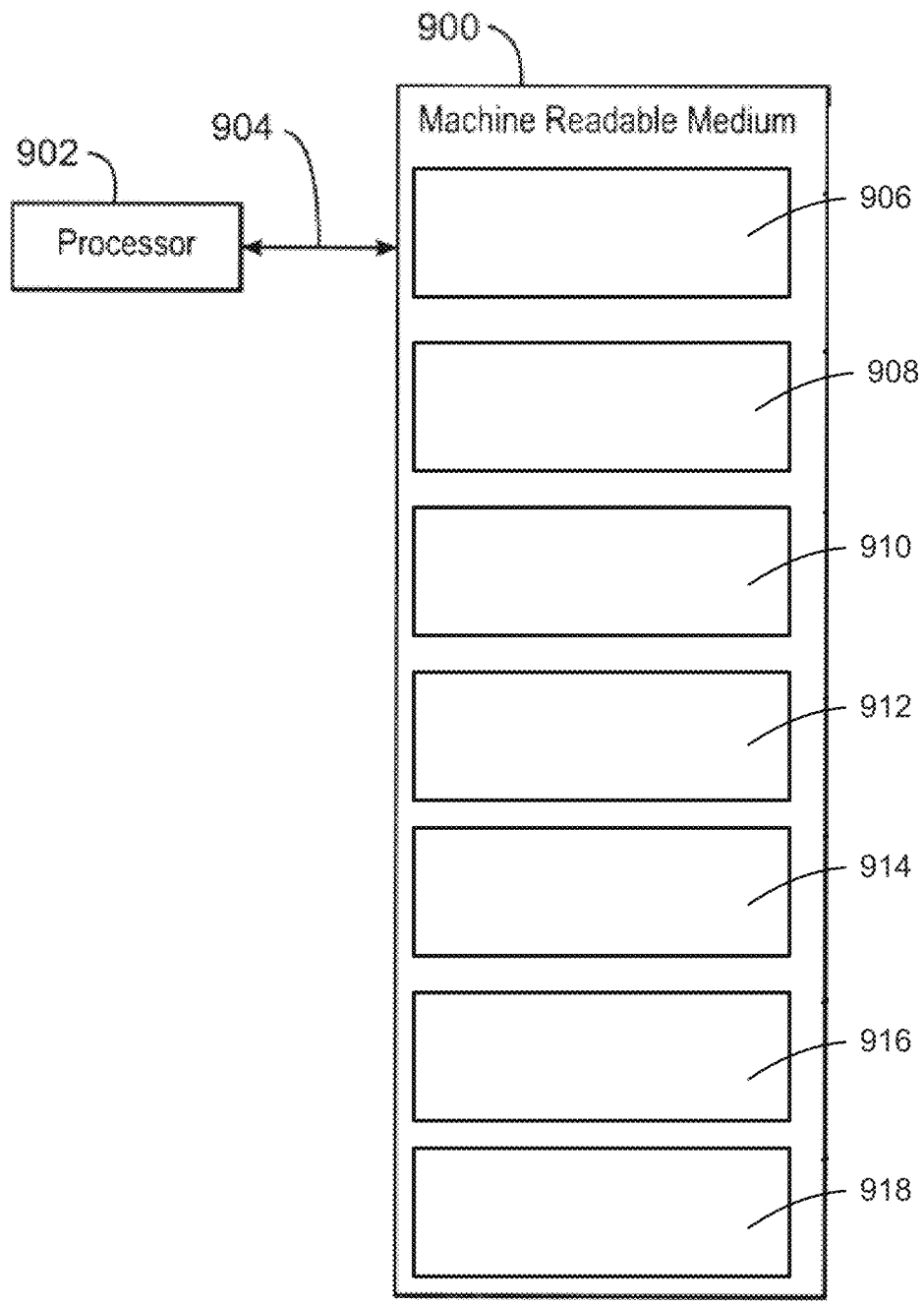
FIG. 18 is a block diagram of a non-transitory, machine readable medium including code to direct a processor to form group objects.

FIG. 18 is a block diagram of a non-transitory, machine readable medium 900 including code to direct a processor 902 to form group objects. In some embodiments, the machine readable medium 900 and/or the processor 902, may be included within one or more of the gateway 1004 (FIG. 1), the gateway 2002 (FIG. 10), the gateway 2108 (FIG. 11), the devices 1006 (FIG. 1), the devices 2004 (FIG. 10), the orphaned device 2102 (FIG. 11), the parent device 2104 (FIG. 11), the devices 2106 (FIG. 11), the backend system 1002 (FIG. 1), the backend system 2006 (FIG. 10), or some combination thereof. The processor 902 may access the non-transitory, machine readable medium 900 over a bus 904. The processor 902 and bus 904 may be selected as described with respect to the processor 802 and bus 806 of FIG. 17. The non-transitory, machine readable medium 900 may include devices described for the mass storage 808 of FIG. 17 or may include optical disks, thumb drives, or any number of other hardware devices.

The non-transitory, machine readable medium 900 may include code 906 to direct the processor 902 to calculate a group name from a list of sub-objects, for example, as described with respect to FIGS. 6 and 7.

The non-transitory, machine readable medium 900 may include code 908 to implement the operation mode selection value generation procedure 1200 (FIG. 2), code 910 to implement the device information acquisition procedure 1300 (FIG. 3), code 912 to implement the network association procedure 1400 (FIG. 4), code 914 to implement the operation mode determination procedure 1500 (FIG. 5), code 916 to implement the operation mode entry procedure 1600 (FIG. 6), or some combination thereof. In some embodiments, the non-transitory, machine readable medium 900 may include code and/or one or more code fragments 918 to implement one or more of the features, procedures, and/or examples (below) described throughout this disclosure.

Example 1 may include a computer device, comprising wireless circuitry to communicate with a leader of a network, and a controller coupled to the wireless circuitry, the controller to identify one or more values located within a message received via the network, wherein the one or more values are generated by the leader, and determine in which of one or more operation modes the computer device is to operate based, at least partially, on the one or more values.

Example 2 may include the computer device of example 1, wherein the one or more operation modes include a relay operation mode and an end point operation mode.

Example 3 may include the computer device of example 1, wherein the one or more operation modes include a relay operation mode, and wherein the computer device is to operate in the relay operation mode in response to a determination, based at least partially on the one or more values, that the computer device is to operate in the relay operation mode within the network.

Example 4 may include the computer device of example 2, wherein the one or more operation modes include an end point operation mode, and wherein the computer device is to operate in the end point operation mode in response to a determination, based at least partially on the one or more values that the computer device is not to operate in the relay operation mode within the network.

Example 5 may include the computer device of any one of the examples 1-4, wherein the message includes a plurality of values, and wherein the controller is to further determine a rank of the computer device within the network, and identify the one or more values, from the plurality of values, based on the one or more values being associated with the rank of the computer device.

Example 6 may include the computer device of example 5, wherein the rank is determined based, at least partially, on a distance from the computer device to the leader.

Example 7 may include the computer device of example 6, wherein the controller is to further determine the distance from the computer device to the leader based on a number of relays between the leader and the computer device, a battery level of the computer device, or a quality of a link between the leader and the computer device.

Example 8 may include the computer device of any one of the examples 1-4, further comprising a battery coupled to the controller, wherein the controller is to further determine a battery level of the battery, and alter the one or more values based on the battery level, wherein the one or more values used to determine in which one of the operation modes the computer device is to operate are the altered one or more values.

Example 9 may include the computer device of example 8, wherein the controller is to further determine whether the battery level is less than a threshold value, wherein the one or more values are altered to zero in response to determination that the battery level is less than the threshold value.

Example 10 may include the computer device of any one of the examples 1-4, wherein the controller to further enter an operation mode, of the one or more operation modes, based on a result of the determination that denotes which of the one or more operation modes the computer device is to operate, initiate a timer in response to the operation mode being entered, and redetermine in which of the one or more operation modes the computer device is to operate in response to an expiration of the timer.

Example 11 may include the computer device of example 10, wherein the controller is to further identify updated one or more values located within a subsequent message received via the network, the updated one or more values generated by the leader, wherein the redetermination of in which of the one or more operation modes the computer device is to operate is based, at least partially, on the updated one or more values.

Example 12 may include the computer device of any one of the examples 1-4, wherein the controller is to further identify information within transmissions from neighboring computer devices within the network to determine a number of the neighboring computer devices, and alter the one or more values based on the number of the neighboring computer devices, wherein the one or more values used to determine in which of the one or more operation modes the computer device is to operate are the altered one or more values.

Example 13 may include a leader apparatus, comprising a controller to identify information associated with one or more computer devices within one or more messages received from the one or more computer devices, the one or more computer devices being within a network coordinated by the leader apparatus, and generate one or more values based on the information associated with the one or more computer devices, the one or more values to facilitate the one or more computer devices in selection of an operation mode. The leader apparatus may further comprise wireless circuitry coupled to the controller and to communicate with the one or more computer devices, the wireless circuitry to transmit the one or more values to the one or more computer devices.

Example 14 may include the leader apparatus of example 13, wherein the information associated with the one or more computer devices includes a number of the one or more computer devices.

Example 15 may include the leader apparatus of example 13, wherein the information associated with the one or more computer devices includes respective indication or indications of quality of link or links between the leader apparatus and the one or more computer devices.

Example 16 may include the leader apparatus of example 13, wherein the information associated with the one or more computer devices includes an indication of a number of neighbors that a computer device, of the one or more computer devices, detects.

Example 17 may include the leader apparatus of example 13, wherein the information associated with the one or more computer devices includes an indication of a number of the one or more computer devices that can operate in a relay operation mode.

Example 18 may include the leader apparatus of example 13, wherein the information associated with the one or more computer devices includes a largest rank associated with the one or more computer devices, the largest rank determined based a number of relays between the leader apparatus and a computer device, of the one or more computer devices, associated with the largest rank.

Example 19 may include the leader apparatus of any one of the examples 13-18, wherein the one or more values include a first value for a first rank of the one or more computer devices, and a second value for a second rank of the one or more computer devices, the second value being different than the first value.

Example 20 may include the leader apparatus of example 19, wherein the first value is based on a number of the one or more computer devices having the first rank and the second value is based on a number of the one or more computer devices having the second rank.

Example 21 may include the leader apparatus of any one of the examples 13-18, further comprising a printed circuit board, the controller mounted to the printed circuit board.

Example 22 may include a method for determining an operation mode of a computer device within a network, comprising identifying, by the computer device, one or more values within a message received via the network, the one or more values generated by a leader of the network, determining, by the computer device, the operation mode for the computer device based, at least partially, on the one or more values, and entering, by the computer device, the operation mode in response to the determination of the operation mode.

Example 23 may include the method of example 22, wherein the operation mode is a relay operation mode, and wherein entering the operation mode includes the computer device commencing operation in the relay operation mode.

Example 24 may include the method of example 22, wherein the operation mode is an end point operation mode, and wherein entering the operation mode includes the computer device commencing operation in the end point operation mode.

Example 25 may include the method of any one of the examples 22-24, further comprising determining, by the computer device, a rank associated with the computer device, wherein identifying the one or more values includes identifying, by the computer device, the one or more values from a plurality of values within the message based on the rank.

Example 26 may include the method of example 25, wherein the rank is defined based on a distance from the computer device to the leader.

Example 27 may include the method of example 26, wherein determining the rank includes determining, by the computer device, the distance from the computer device to the leader based on a number of relays between the leader and the computer device, a battery level of the computer device, or a quality of a link between the leader and the computer device.

Example 28 may include the method of any one of the examples 22-24, further comprising determining, by the computer device, a battery level of the computer device, and altering, by the computer device, the one or more values based on the battery level, wherein the one or more values used for the determination of the operation mode for the computer device is the altered one or more values.

Example 29 may include the method of example 28, further comprising comparing, by the computer device, the battery level to a threshold value, and determining, by the computer device, that the battery level is less than the threshold value based on the comparison, wherein the alteration of the one or more values includes altering the one or more values to zero based on the determination that the battery level is less than the threshold value.

Example 30 may include the method of any one of the examples 22-24, further comprising initiating, by the computer device, a timer in response to entry into the operation mode, and redetermining, by the computer device, the operation mode for the computer device in response to an expiration of the timer.

Example 31 may include the method of example 30, further comprising identifying updated one or more values located within a subsequent message received via the network, the updated one or more values generated by the leader, wherein the redetermination of the operation mode is based, at least partially, on the updated one or more values.

Example 32 may include the method of any one of the examples 22-24, further comprising identifying, by the computer device, information within transmissions from neighboring computer devices within the network to determine a number of the neighboring computer devices, and altering, by the computer device, the one or more values based on the number of neighboring computer devices, wherein the one or more values used for the determination of the operation mode for the computer device is the altered one or more values.

Example 33 may include a method of coordinating operation modes of one or more computer devices within a network, comprising identifying, by a leader of the network, information associated with one or more computer devices within transmissions from at least a portion of the one or more computer devices, determining, by the leader, a number of the one or more computer devices to operate in a relay operation mode based on the information, generating, by the leader, one or more values based on the number of the one or more computer devices to operate in the relay operation mode, the one or more values to facilitate the one or more computer devices in selection of operation mode, and transmitting, by the leader, the one or more values to the one or more computer devices.

Example 34 may include the method of example 33, wherein the information includes a total number of the one or more computer devices.

Example 35 may include the method of example 33, wherein the information includes an indication of a quality of links between the leader and the one or more computer devices.

Example 36 may include the method of example 33, wherein the information includes an indication of a number of neighbors that a computer device, of the one or more computer devices, detects.

Example 37 may include the method of example 33, wherein the information includes an indication of a number of the one or more computer devices capable of operating in a relay operation mode.

Example 38 may include the method of example 33, wherein the information includes a largest rank associated with the one or more computer devices, the largest rank determined based on a number of relays between the leader and a computer device, of the one or more computer devices, associated with the largest rank.

Example 39 may include the method of any one of the examples 33-38, wherein the one or more values include a first value for a first rank of the one or more computer devices, and a second value for a second rank of the one or more computer devices, the second value being different than the first value.

Example 40 may include the method of example 39, wherein the first value is based on a number of the one or more computer devices having the first rank and the second value is based on a number of the one or more computer devices having the second rank.

Example 41 may include one or more computer-readable media having instructions stored thereon, wherein the instructions, in response to execution by a computer device, cause the computer device to identify a message transmitted by a leader of a network, wherein the message includes one or more values, identify a specific value associated with the computer device from the one or more values, and determine in which of one or more operation modes the computer device is to operate based, at least partially, on the specific value.

Example 42 may include the one or more computer-readable media of example 41, wherein the one or more operation modes include a relay operation mode and an end point operation mode Example 43 may include the one or more computer-readable media of example 41, wherein the one or more operation modes include a relay operation mode, and wherein the instructions cause the computer device to further enter the relay operation mode in response to a determination, based at least partially on the specific value, that the computer device is to operate in the relay operation mode.

Example 44 may include the one or more computer-readable media of example 42, wherein the one or more operation modes include an end point operation mode, and wherein the instructions cause the computer device to further enter the end point operation mode in response to a determination, based at least partially on the specific value, that the computer device is not to operate in the relay operation mode.

Example 45 may include the one or more computer-readable media of any one of the examples 41-44, wherein the instructions cause the computer device to further determine a rank of the computer device within the network, wherein the specific value is identified based on the rank.

Example 46 may include the one or more computer-readable media of example 45, wherein the instructions cause the computer device to further determine a number of relays between the leader and the computer device, a battery level of the computer device, or a quality of a link between the leader and the computer device, wherein the rank is based on the number of relays, the battery level, or the quality.

Example 47 may include the one or more computer-readable media of any one of the examples 41-44, wherein the instructions cause the computer device to further determine a battery level of the computer device, determine that the battery level of the computer device is less than a threshold value, and alter the specific value to zero based on the battery level being less than the threshold value, wherein the specific value used for determination of in which of the one or more operation modes the computer device is to operate is the altered specific value.

Example 48 may include the one or more computer-readable media of any one of the examples 41-44, wherein the instructions cause the computer device to further enter an operation mode, of the one or more operation modes, based on a result of the determination that denotes which of the one or more operation modes the computer device is to operate, initiate a timer in response to the operation mode being entered, identify an updated specific value associated with the computer device, and redetermine, based at least partially on the updated specific value, in which of the one or more operation modes the computer device is to operate in response to an expiration of the timer.

Example 49 may include the one or more computer-readable media of example 48, wherein the updated specific value is identified from within a subsequent message received from the leader.

Example 50 may include the one or more computer-readable media of any one of the examples 41-44, wherein the instructions cause the computer device to further identify information within transmissions from neighboring computer devices within the network to determine a number of the neighboring computer devices, and alter the specific value based on the number of the neighboring computer devices, wherein the specific value used to determination in which of the one or more operation modes the computer device is to operate is the altered specific value.

Example 51 may include one or more computer-readable media having instructions stored thereon, wherein the instructions, in response to execution by a leader, cause the leader to identify information associated with one or more computer devices within transmissions from at least a portion of the one or more computer devices, the one or more computer devices being within a network coordinated by the leader, determine, based on the information, a number of the one or more computer devices and ranks associated with the one or more computer devices, generate one or more values based on the number of the one or more computer devices and the ranks associated with the one or more computer devices, the one or more values to facilitate the one or more computer devices in selection of an operation mode, and transmit a message that includes the one or more values to the network.

Example 52 may include the one or more computer-readable media of example 51, wherein the information associated with the one or more computer devices includes an indication of a quality of link or links between the leader and the one or more computer devices.

Example 53 may include the one or more computer-readable media of example 51, wherein the information associated with the one or more computer devices includes an indication of a number of neighbors that a computer device, of the one or more computer devices, detects.

Example 54 may include the one or more computer-readable media of example 51, wherein the information associated with the one or more computer devices includes an indication of a number of the one or more computer devices that can operate in a relay operation mode.

Example 55 may include the one or more computer-readable media of any one of the examples 51-54, wherein the ranks associated with the one or more computer devices are based on a number of relays between the leader and each of the one or more computer devices.

Example 56 may include a computer device, comprising means to identify one or more values within a message received via a network, the one or more values generated by a leader of the network, means to determine the operation mode for the computer device based, at least partially, on the one or more values, and means to enter the operation mode in response to determination, by the means to determine, of the operation mode.

Example 57 may include the computer device of example 56, wherein the operation mode is a relay operation mode, and wherein means to enter the operation mode includes means to commence operation in the relay operation mode.

Example 58 may include the computer device of example 56, wherein the operation mode is an end point operation mode, and wherein means to enter the operation mode includes means to commence operation in the end point operation mode.

Example 59 may include the computer device of any one of the examples 56-58, further comprising means to determine a rank associated with the computer device, wherein the means to identify the one or more values includes means to identify the one or more values from a plurality of values within the message based on the rank.

Example 60 may include the computer device of example 59, wherein the rank is defined based on a distance from the computer device to the leader.

Example 61 may include the computer device of example 60, wherein means to determine the rank includes means to determine the distance from the computer device to the leader based on a number of relays between the leader and the computer device, a battery level of the computer device, or a quality of a link between the leader and the computer device.

Example 62 may include the computer device of any one of the examples 56-58, further comprising means to determine a battery level of the computer device, and means to alter the one or more values based on the battery level, wherein the one or more values used for determination of the operation mode for the computer device is the altered one or more values.

Example 63 may include the computer device of example 62, further comprising means to compare the battery level to a threshold value, and means to determine that the battery level is less than the threshold value based on comparison of the battery level to the threshold value, wherein the means to alter the one or more values includes means to alter the one or more values to zero based on the determination that the battery level is less than the threshold value.

Example 64 may include the computer device of any one of the examples 56-58, further comprising means to initiate a timer in response to entry into the operation mode, and means to redetermine the operation mode for the computer device in response to an expiration of the timer.

Example 65 may include the computer device of example 64, further comprising means to identify updated one or more values located within a subsequent message received via the network, the updated one or more values generated by the leader, wherein redetermination, by the means to redetermine, of the operation mode is based, at least partially, on the updated one or more values.

Example 66 may include the computer device of any one of the examples 56-58, further comprising means to identify information within transmissions from neighboring computer devices within the network to determine a number of the neighboring computer devices, and means to alter the one or more values based on the number of neighboring computer devices, wherein the one or more values used for determination, by the means to determine, of the operation mode for the computer device is the altered one or more values.

Example 67 may include a leader apparatus, comprising means to identify information associated with one or more computer devices within transmissions from at least a portion of the one or more computer devices, means to determine a number of the one or more computer devices to operate in a relay operation mode based on the information, means to generate one or more values based on the number of the one or more computer devices to operate in the relay operation mode, the one or more values to facilitate the one or more computer devices in selection of operation mode, and means to transmit the one or more values to the one or more computer devices.

Example 68 may include the leader apparatus of example 67, wherein the information includes a total number of the one or more computer devices.

Example 69 may include the leader apparatus of example 67, wherein the information includes an indication of a quality of links between the leader apparatus and the one or more computer devices.

Example 70 may include the leader apparatus of example 67, wherein the information includes an indication of a number of neighbors that a computer device, of the one or more computer devices, detects.

Example 71 may include the leader apparatus of example 67, wherein the information includes an indication of a number of the one or more computer devices capable of operation within a relay operation mode.

Example 72 may include the leader apparatus of example 67, wherein the information includes a largest rank associated with the one or more computer devices, the largest rank determined based on a number of relays between the leader apparatus and a computer device, of the one or more computer devices, associated with the largest rank.

Example 73 may include the leader apparatus of any one of the examples 67-72, wherein the one or more values include a first value for a first rank of the one or more computer devices, and a second value for a second rank of the one or more computer devices, the second value being different than the first value.

Example 74 may include the leader apparatus of example 73, wherein the first value is based on a number of the one or more computer devices having the first rank and the second value is based on a number of the one or more computer devices having the second rank.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A computer device, comprising:
   wireless circuitry to communicate with a leader of a network; and
   a controller coupled to the wireless circuitry, the controller to:
   identify one or more operation mode selection values located within a message received via the network, wherein the one or more operation mode selection values are generated by the leader, and the one or more operation mode selection values correspond to a rank;
   determine a rank of the computer device within the network; and
   determine in which of one or more operation modes the computer device is to operate based, at least partially, on an operation mode selection value of the one or more operation mode selection values that corresponds to the rank of the computer device.

2. The computer device of claim 1, wherein the one or more operation modes include a relay operation mode and an end point operation mode.

3. The computer device of claim 1, wherein the one or more operation modes include a relay operation mode, and wherein the computer device is to operate in the relay operation mode in response to a determination, based at least partially on the one or more operation mode selection values, that the computer device is to operate in the relay operation mode within the network.

4. The computer device of claim 2, wherein the one or more operation modes include an end point operation mode, and wherein the computer device is to operate in the end point operation mode in response to a determination, based at least partially on the one or more operation mode selection values, that the computer device is not to operate in the relay operation mode within the network.

5. The computer device of claim 1, wherein the message includes a plurality of operation mode selection values, and wherein the controller is to:
identify the one or more operation mode selection values, from the plurality of operation mode selection values, based on the one or more operation mode selection values being associated with the rank of the computer device.

6. The computer device of claim 5, wherein the controller is to determine the rank of the computer device based, at least partially, on one or more of: a distance from the computer device to the leader, a battery level of the computer device, and a network density.

7. The computer device of claim 6, wherein the controller is to:
when the controller is to determine the rank based on the distance from the computer device to the leader, determine the distance from the computer device to the leader based on one or more of: a number of relays between the leader and the computer device, a quality of a link between the leader and the computer device, a transmission power of a transmission received from the leader or a relay, and a transmission power required to transmit a transmission to the leader or a relay; and
when the controller is to determine the rank based on the network density, determine the network density based on a number of collected beacons or routing advertisements obtained from one or more neighboring nodes.

8. The computer device of claim 1, further comprising a battery coupled to the controller, wherein the controller is to:
determine a battery level of the battery; and
alter the one or more operation mode selection values based on the battery level, wherein the one or more operation mode selection values used to determine in which one of the operation modes the computer device is to operate are the altered one or more operation mode selection values.

9. A leader apparatus, comprising:
a controller to:
identify information associated with one or more computer devices within one or more messages received from at least a portion of the one or more computer devices, the one or more computer devices being within a network coordinated by the leader apparatus; and
generate one or more operation mode selection values based on the information associated with the one or more computer devices, the one or more operation mode selection values to facilitate the one or more computer devices in selection of an operation mode based on ranks of the one or more computer devices within the network as determined by respective ones of the one or more computer devices; and
wireless circuitry coupled to the controller and to communicate with the one or more computer devices, the wireless circuitry to transmit the one or more operation mode selection values to the one or more computer devices.

10. The leader apparatus of claim 9, wherein the information associated with the one or more computer devices includes respective indication or indications of quality of link or links between the leader apparatus and the one or more computer devices.

11. The leader apparatus of claim 9, wherein the information associated with the one or more computer devices includes an indication of a number of neighbors that a computer device, of the one or more computer devices, detects.

12. The leader apparatus of claim 9, wherein the information associated with the one or more computer devices includes an indication of a number of the one or more computer devices that can operate in a relay operation mode.

13. The leader apparatus of claim 9, wherein the one or more operation mode selection values include:
a first operation mode selection value for a first rank of the one or more computer devices; and
a second operation mode selection value for a second rank of the one or more computer devices, the second operation mode selection value being different than the first operation mode selection value.

14. The leader apparatus of claim 13, wherein the first operation mode selection value is based on a number of the one or more computer devices having the first rank and the second operation mode selection value is based on a number of the one or more computer devices having the second rank.

15. One or more non-transitory computer-readable media (NTCRM) comprising instructions, wherein execution of the instructions by a computer device is to cause the computer device to:
identify a message transmitted by a leader of a network, wherein the message includes one or more operation mode selection values;
determine a rank of the computer device within the network;
identify a specific operation mode selection value associated with the rank of the computer device from the one or more operation mode selection values; and
determine in which of one or more operation modes the computer device is to operate based, at least partially, on the specific operation mode selection value.

16. The one or more NTCRM of claim 15, wherein the one or more operation modes include a relay operation mode and an end point operation mode.

17. The one or more NTCRM of claim 15, wherein the one or more operation modes include a relay operation mode, and wherein execution of the instructions is to cause the computer device to:
enter the relay operation mode in response to a determination, based at least partially on the specific operation mode selection value, that the computer device is to operate in the relay operation mode.

18. The one or more NTCRM of claim 16, wherein the one or more operation modes include an end point operation mode, and wherein execution of the instructions is to cause the computer device to:
enter the end point operation mode in response to a determination, based at least partially on the specific operation mode selection value, that the computer device is not to operate in the relay operation mode.

19. The one or more NTCRM of claim 15, wherein execution of the instructions is to cause the computer device to:
determine the rank of the computer device within the network based in part on one or more of a distance from the computer device to the leader, a battery level of the computer device, and a network density, wherein the specific operation mode selection value is identified based on the rank.

20. The one or more NTCRM of claim 19, wherein execution of the instructions is to cause the computer device to:
when the rank is to be based on the distance, determine the distance based on one or more of a number of relays between the leader and the computer device, a quality of a link between the leader and the computer device, a transmission power of a transmission received from the leader or a relay, and a transmission power required to transmit a transmission to the leader or a relay; and
when the rank is to be based on the network density, determine the network density based on a number of collected beacons or routing advertisements obtained from one or more neighboring nodes.

21. The one or more NTCRM of claim 15, wherein execution of the instructions is to cause the computer device to further:
determine a battery level of the computer device;
determine that the battery level of the computer device is less than a threshold value; and
alter the specific operation mode selection value to zero based on the battery level being less than the threshold value, wherein the specific operation mode selection value used for determination of in which of the one or more operation modes the computer device is to operate is the altered specific operation mode selection value.

22. The one or more NTCRM of claim 15, wherein execution of the instructions is to cause the computer device to:
enter an operation mode, of the one or more operation modes, based on a result of the determination that denotes in which of the one or more operation modes the computer device is to operate;
initiate a timer in response to the operation mode being entered;
identify an updated specific operation mode selection value associated with the computer device; and
redetermine, based at least partially on the updated specific operation mode selection value, in which of the one or more operation modes the computer device is to operate in response to an expiration of the timer.

23. The one or more NTCRM of claim 15, wherein execution of the instructions is to cause the computer device to:
identify information within transmissions from neighboring computer devices within the network to determine a number of the neighboring computer devices; and
alter the specific operation mode selection value based on the number of the neighboring computer devices, wherein the specific operation mode selection value used to determination in which of the one or more operation modes the computer device is to operate is the altered specific operation mode selection value.

24. One or more non-transitory computer-readable media (NTCRM) comprising instructions, wherein execution of the instructions by a leader is to cause the leader to:
identify information associated with one or more computer devices within transmissions from at least a portion of the one or more computer devices, the one or more computer devices being within a network coordinated by the leader;
determine, based on the information, a number of the one or more computer devices and ranks associated with the one or more computer devices;
generate one or more values based on the number of the one or more computer devices and the ranks associated with the one or more computer devices, the one or more values to facilitate the one or more computer devices in selection of an operation mode; and
transmit a message that includes the one or more values to the network.

25. The one or more NTCRM of claim 24, wherein the ranks associated with the one or more computer devices are based on a number of relays between the leader and each of the one or more computer devices.

* * * * *